United States Patent
Ohsaki

(10) Patent No.: US 7,779,626 B2
(45) Date of Patent: Aug. 24, 2010

(54) ESTIMATING DEVICE FOR EXHAUST TEMPERATURE IN INTERNAL COMBUSTION ENGINE

(75) Inventor: Satoru Ohsaki, Kariya (JP)

(73) Assignee: Denso Corporation, Kariya (JP)

( * ) Notice: Subject to any disclaimer, the term of this patent is extended or adjusted under 35 U.S.C. 154(b) by 1273 days.

(21) Appl. No.: 11/294,487

(22) Filed: Dec. 6, 2005

(65) Prior Publication Data

US 2006/0117737 A1    Jun. 8, 2006

(30) Foreign Application Priority Data

Dec. 6, 2004 (JP) ............................... 2004-352393

(51) Int. Cl.
*F01N 3/02* (2006.01)
(52) U.S. Cl. .............................. 60/320; 60/276; 60/285; 60/286
(58) Field of Classification Search .................... 60/320, 60/276, 284–287, 274
See application file for complete search history.

(56) References Cited

U.S. PATENT DOCUMENTS

| 5,719,778 | A | 2/1998 | Suzumura et al. |
| 5,771,688 | A | 6/1998 | Hasegawa et al. |
| 6,422,000 | B1 | 7/2002 | Poggio et al. |
| 6,508,111 | B2 | 1/2003 | Osaki et al. |
| 6,571,602 | B2 | 6/2003 | Ohkuma |
| 6,679,238 | B2 * | 1/2004 | Nebiyeloul-Kifle et al. . 123/676 |
| 7,286,926 | B2 * | 10/2007 | Gotoh et al. ................. 701/114 |
| 2001/0035172 | A1 | 11/2001 | Osaki et al. |
| 2002/0005064 | A1 | 1/2002 | Ohkuma |
| 2003/0019865 | A1 * | 1/2003 | Whitney et al. ............. 219/497 |
| 2003/0178016 | A1 * | 9/2003 | Nebiyeloul-Kifle et al. . 123/676 |
| 2004/0122584 | A1 * | 6/2004 | Muto et al. ................. 701/108 |
| 2006/0235603 | A1 * | 10/2006 | Kobayashi et al. .......... 701/108 |

FOREIGN PATENT DOCUMENTS

| JP | 8-246962 | 9/1996 |
| JP | 2000-227364 | 8/2000 |

(Continued)

OTHER PUBLICATIONS

Japanese Office Action dated Apr. 3, 2009, issued in corresponding Japanese Application No. 2004-352393, with English translation.

(Continued)

*Primary Examiner*—Thomas E. Denion
*Assistant Examiner*—Jesse Bogue
(74) *Attorney, Agent, or Firm*—Nixon & Vanderhye P.C.

(57) ABSTRACT

An intake pipe of an engine has an injector, while an exhaust pipe has an A/F (air/fuel) sensor that contains a heater. An ECU detects an element impedance of the air/fuel sensor, and computes an emitted heat quantity of the A/F sensor based on the detected element impedance. The ECU further controls energization of the heater of the A/F sensor and computes a heater release quantity associated with the energization of the heater. Furthermore, the ECU estimates exhaust temperature from a balance between the emitted heat quantity of the A/F sensor and the heater heat release quantity by using at least one of an emitted heat quantity-related parameter and a heat release quantity-related parameter. These two parameters can be calibrated.

22 Claims, 13 Drawing Sheets

FOREIGN PATENT DOCUMENTS

| | | |
|---|---|---|
| JP | 2001-193522 | 7/2001 |
| JP | 2001-241347 | 9/2001 |
| JP | 2003-065111 | 3/2003 |
| JP | 2003-222043 | 8/2003 |

OTHER PUBLICATIONS

Office Action issued Jul. 17, 2009 in corresponding Japanese Application No. 2004-352393 and an at least partial English language translation thereof.

* cited by examiner

ESTIMATING DEVICE FOR EXHAUST TEMPERATURE IN INTERNAL COMBUSTION ENGINE

CROSS REFERENCE TO RELATED APPLICATIONS

This application is based on and incorporates herein by reference Japanese Patent Application No. 2004-352393 filed on Dec. 6, 2004.

FIELD OF THE INVENTION

The present invention relates to an estimating device for exhaust temperature in an internal combustion engine.

BACKGROUND OF THE INVENTION

In an internal combustion engine, the exhaust temperature changes according to the operating state of the engine or the like. When this exhaust temperature is learned, it can be incorporated into varied control and the like. To do this, a temperature sensor for exhaust temperature detection can be simply installed. However, this will lead to increased cost. To cope with this, various techniques to estimate the exhaust temperature have been proposed. For example, the exhaust temperature measuring instrument disclosed in Patent Document 1 is so constructed as to estimate the exhaust temperature as follows: its air to fuel ratio sensor of an electric current limiting type is provided with a heater for activating that sensor; while the heater is being energized, the energization is temporarily interrupted; the exhaust temperature is estimated based on the state of variation in element impedance at that time.

However, the above-mentioned technique disclosed in Patent Document 1 has a problem. In the technique, for example, it is required to forcibly interrupt the energization of a heater. The active state of the air to fuel ratio sensor is changed with the interruption of the heater energization, and the air-fuel ratio cannot be detected with accuracy. Therefore, even though the exhaust temperature can be estimated, the control on the air-fuel ratio of the internal combustion engine and the like are harmfully affected.

Patent Document 1: JP-2000-227364 A

SUMMARY OF THE INVENTION

It is a major object of the present invention to provide an estimating device for exhaust temperature in an internal combustion engine wherein the exhaust temperature can be estimated with accuracy without inviting problems, such as increase in cost.

In the present invention, the following operation is performed: with respect to a gas sensor with a heater installed in the exhaust system of an internal combustion engine, the element temperature of the gas sensor or a parameter in correlation thereto is detected, and the quantity of heat released from the heater associated with the energization of the heater is computed. Then, the exhaust temperature is estimated based on the detected element temperature of the gas sensor or the parameter in correlation thereto and the computed heater heat release quantity.

More specific description will be given. When a gas sensor installed in the exhaust system of an internal combustion engine is heated with a heater, the element temperature changes according to change in exhaust temperature (the temperature of the area in the vicinity of the sensor) or the heater heat release quantity. In this case, the exhaust temperature can be estimated based on element temperature or a parameter in correlation thereto and heater heat release quantity, using the correlation between them. Therefore, even when the exhaust temperature must be detected in various applications, no additional construction, such as an exhaust temperature sensor, is required. As a result, the exhaust temperature can be estimated with accuracy without inviting such a problem as increase in cost due to the addition of a sensor or the like.

In such a construction that the amount of heater energizing operation is feedback controlled so that the element temperature of a gas sensor or a parameter in correlation thereto agrees with a predetermined target value, it is advisable to compute the heater heat release quantity based on that amount of heater energizing operation. In this case, when the exhaust temperature that is the temperature of the area in the vicinity of the sensor changes, the amount of heater energizing operation is accordingly adjusted as the change occurs. Therefore, the exhaust temperature can be estimated based on the amount of heater energizing operation. As the amount of heater energizing operation, control duty ratio, heater applied voltage, and the like can be used.

With the heat balance of the gas sensor between the area in the vicinity thereof taken into account, the following can be said: the quantity of heat emitted from the gas sensor in proportion to the temperature difference between the element temperature of the gas sensor and the exhaust temperature and the heater heat release quantity in proportion to heater power at that time basically agree with each other. Therefore, it is advisable to estimate the exhaust temperature based on the balance between the quantity of heat emitted from the gas sensor and the heater heat release quantity. In this case, it can be considered that, when the element temperature is kept constant, the relation expressed as "the quantity of heat emitted from the gas sensor=the heater heat release quantity" holds. Thus, the exhaust temperature can be estimated by learning the element temperature (or a parameter in correlation thereto) and heater power.

With such factors as variation between individual units and variation with time taken into account, the following can be considered: there are cases where an emitted heat quantity-related parameter that is related to the emitted heat quantity of a gas sensor and a heat release quantity-related parameter that is related to the heat release quantity of a heater differ from predetermined numeric values. Consequently, it is advisable to calibrate at least either the emitted heat quantity-related parameter or the heat release quantity-related parameter as appropriate. The accuracy of exhaust temperature estimation is enhanced by calibrating the parameter as mentioned above.

In this case, a value obtained by multiplying the temperature difference between the element temperature of a gas sensor and the exhaust temperature by a proportional coefficient is equal to the emitted heat quantity of the gas sensor. Therefore, it is advisable to take the following procedure: a proportional coefficient for converting the temperature difference between element temperature and exhaust temperature into the emitted heat quantity of the gas sensor or a correction coefficient for that proportional coefficient is taken as the above-mentioned emitted heat quantity-related parameter; and the above-mentioned proportional coefficient or the correction coefficient for that proportional coefficient is thereby calibrated. Thus, any error in proportional coefficient can be absorbed, and the relation between the temperature difference between element temperature and exhaust temperature and the emitted heat quantity of a gas sensor can be made favorable.

Or, it is advisable to take a heater resistance or a heater resistance correction coefficient required for computing heater power as the above-mentioned heat release quantity-related parameter, and to calibrate that heater resistance or heater resistance correction coefficient. Thus, variation in heater resistance can be absorbed, and the heater heat release quantity can be grasped with accuracy.

Here, it is determined whether the exhaust system of the internal combustion engine is in such a state that its temperature is a known given temperature. When the exhaust system is in such a state that its temperature is the known temperature, energization of the heater is permitted. It is advisable to compare the emitted heat quantity of the gas sensor with the heater heat release quantity at that time, and to calibrate at least either the emitted heat quantity-related parameter or the heat release quantity-related parameter based on the comparison. In such a state that the temperature of the exhaust system of an internal combustion engine (i.e., the temperature of the area in the vicinity of a sensor) is the known temperature, the emitted heat quantity of a gas sensor can be learned. Without variation between individual units, variation with time, or the like, the emitted heat quantity of the gas sensor and the heater heat release quantity essentially agree with each other. Therefore, the emitted heat quantity-related parameter or the heat release quantity-related parameter can be calibrated through comparison of the emitted heat quantity of the gas sensor with the heater heat release quantity.

It is advisable to take the following procedure: when an internal combustion engine is at a stop and the temperature of its exhaust system substantially agrees with the ambient temperature, the exhaust system of the internal combustion engine is determined to be in such a state that its temperature is the known temperature. In this case, for example, the following methods described under Items (i) and (ii) can be used as unit for determining whether the exhaust system is in such a state that its temperature substantially agrees with the ambient temperature:

(i) Based on that the cooling water temperature of an internal combustion engine is sufficiently approximate to the ambient temperature, it is determined whether the internal combustion engine is in a cold stop state. More specific description will be given. In general, change in exhaust system temperature is faster than change in water temperature. Therefore, when the water temperature is sufficiently lowered to a temperature approximately equal to the ambient temperature, it can be thought that the exhaust system temperature is also approximately equal to the ambient temperature. As a result, the temperature of the area in the vicinity of the sensor should also be approximately equal to the ambient temperature. For this reason, the exhaust system can be determined to be in such a state that its temperature substantially agrees with the ambient temperature.

(ii) Based on that after the operation of an internal combustion engine is stopped, a predetermined time enough to cool the internal combustion engine has passed, it is determined whether the internal combustion engine is in a cold stop state. More specific description will be given. When a sufficient time has passed after the internal combustion engine is stopped, the temperature of the area in the vicinity of the sensor should also be approximately equal to the ambient temperature. Therefore, the exhaust system can be determined to be in such a state that its temperature substantially agrees with the ambient temperature.

It is advisable to correct the above-mentioned proportional coefficient for converting the temperature difference between element temperature and exhaust temperature into the emitted heat quantity of a gas sensor based on the operating state of the internal combustion engine at that time. In this case, especially, it is desirable that the proportional coefficient should be corrected based on a parameter in correlation to exhaust flow velocity or a parameter in correlation to exhaust density. More specific description will be given. When the exhaust flow velocity or the exhaust density changes, the degree of heat emission from a gas sensor is changed. An optimal proportional coefficient can be set by correcting the proportional coefficient based on the operating state of the internal combustion engine, and this leads to the enhancement of the accuracy of exhaust temperature estimation. As a parameter in correlation to exhaust flow velocity, for example, the number of engine revolutions can be used, and as a parameter in correlation to exhaust density, for example, intake air quantity can be used.

When the heater heat release quantity changes, the element temperature is changed with a predetermined delay in response to that change. At this time, the response time constant representing that delay in response can be represented as "Ce/K," where Ce is the heat capacity of an element and K is a proportional coefficient. (The proportional coefficient is for converting the temperature difference between element temperature and exhaust temperature into the emitted heat quantity of a gas sensor.) In this case, the proportional coefficient K can be calculated back by measuring the response time constant (delay in response) of the element temperature because the heat capacity Ce can be considered to be substantially invariable.

Grounds that the response time constant (delay in response) of element temperature is represented as "Ce/K" are as follows: letting element temperature be T, the heat capacity of an element Ce, heater applied voltage V, heater resistance R, control duty Duty, and proportional coefficient K, there is the relation expressed by Expression (1) between control duty Duty and element temperature T

[Expression 1]

$$\frac{dT}{dt} = \frac{1}{Ce}\left(\frac{V^2}{R} \cdot \text{Duty} - K \cdot T\right) \qquad (1)$$

The term of "V²/R·Duty" is equivalent to heater heat release quantity. When the above expression is subjected to Laplace transform and rearranged, the transfer function expressed by Expression (2) is obtained.

[Expression 2]

$$T(s) = \frac{V^2}{Ce \cdot R} \cdot \frac{D(s)}{s - K/Ce} \qquad (2)$$

According to Expression (2), the reciprocal of "K/Ce" is equivalent to time constant. As mentioned above, therefore, the response time constant (delay in response) of element temperature is represented as "Ce/K."

Consequently, the present invention takes the following procedure: when the heater heat release quantity changes, the delay in response to that change of the element temperature is measured; based on the measured delay in response, the proportional coefficient for converting the temperature difference between element temperature and exhaust temperature into the emitted heat quantity of a gas sensor is computed. Computing the proportional coefficient as mentioned above makes it possible to absorb any error in proportional coefficient and properly bring the temperature difference between element temperature and exhaust temperature into correspondence with the emitted heat quantity of the gas sensor. As a result, the accuracy of exhaust temperature estimation can be enhanced.

It is advisable to provide a unit for forcibly temporarily changing the amount of heater energizing operation, and to vary the heater heat release quantity through this change in amount of heater energizing operation. Thus, the proportional coefficient can be computed with desired timing.

When the exhaust temperature of the internal combustion engine is expected to be steady at this time, it is preferable that the above-mentioned amount of heater energizing operation should be forcibly temporarily varied. Thus, variation in heater heat release quantity becomes as desired, and the accuracy of proportional coefficient computation is enhanced.

It is advisable to store the computed proportional coefficient in backup memory as a learning value. Thus, even when the proportional coefficient is steadily varied due to an aging factor or the like or in like cases, the temperature difference between element temperature and exhaust temperature can be properly brought into correspondence with the emitted heat quantity of a gas sensor. In this case, especially, it is preferable that the following procedure should be taken: multiple areas are provided by dividing the storage area of backup memory according to the operating ranges of the internal combustion engine; and a computed value of proportional coefficient is stored in accordance with the range of engine operation on each occasion.

The element temperature is changed with a predetermined delay relative to change in heater heat release quantity. Immediately after the heater heat release quantity (the amount of heater energizing operation) changes, the emitted heat quantity of gas sensor is not equal to the heater heat release quantity. Therefore, it is advisable to compute the temperature difference between element temperature and exhaust temperature based on the heater heat release quantity, and to perform delay correction of that temperature difference with a time constant equivalent to a delay in change in element temperature relative to change in heater heat release quantity. Thus, the transient response of element temperature to change in heater heat release quantity can be taken into account, and the exhaust temperature can be estimated with accuracy.

It is thought that the above-mentioned time constant (the delay in response of change in element temperature relative to change in heater heat release quantity) is varied due to the operating conditions of the internal combustion engine, an aging factor, or the like. Consequently, when the heater heat release quantity changes, the time constant of element temperature is measured. It is advisable to use the measured time constant for the above-mentioned delay correction. Thus, the exhaust temperature can be estimated with accuracy regardless of the operating conditions of the internal combustion engine, an aging factor, or the like. In this case, such a construction that the heater heat release quantity is varied by forcibly temporarily changing the amount of heater energizing operation may be adopted.

When the exhaust temperature is changed due to change in the number of engine revolutions or load, the element temperature changes with a delay, and the emitted heat quantity of gas sensor is not equal to the heater heat release quantity. Therefore, it is advisable to perform advance correction of an estimated value of exhaust temperature with a time constant equivalent to a delay in change in element temperature relative to change in exhaust temperature. Thus, the transient response of element temperature to change in exhaust temperature can be taken into account, and the exhaust temperature can be estimated with accuracy.

It is advisable to determine whether at least any one of a gas sensor, a heater, a temperature detecting unit, and an energization controlling unit is anomalous, and to avoid carrying out exhaust temperature estimation by the above-mentioned estimating unit when any one is anomalous. Thus, the reliability of an estimated value of exhaust temperature can be enhanced.

When an internal combustion engine is operated under high load, in general, the fuel quantity is increased to prevent exhaust system components, such as a catalyst, from being overheated. This fuel quantity increase is carried out using a compatible value (e.g., map value). In this case, optimal fuel quantity increase can be carried out by correcting the fuel quantity increase based on the exhaust temperature estimated by the above-mentioned estimating unit. This prevents various problems including degradation in fuel economy due to excessive fuel quantity increase, the emission of unburned fuel (HC), and the like. Specifically, it is advisable to reduce the fuel quantity increase when an estimated value of exhaust temperature is low.

When an anomaly (failure) occurs in at least any of a gas sensor, a heater, a temperature detecting unit, and an energization controlling unit, the element temperature or a parameter in correlation thereto becomes unknown, and exhaust temperature estimation becomes inaccurate. Therefore, it is advisable to avoid correcting the fuel quantity increase by an estimated value of exhaust temperature when the gas sensor or the like is anomalous.

In an internal combustion engine provided with an EGR unit, an estimated value of exhaust temperature can be utilized as described under Items (1) to (4) below. In any case, a more advantageous effect can be obtained by using an accurate estimated value of exhaust temperature.

(1) In such a construction that the EGR flow rate of an EGR unit is estimated, an estimated value of EGR flow rate is corrected based on an estimated value of exhaust temperature. Though the EGR flow rate is varied according to the exhaust temperature, the EGR flow rate can be determined with accuracy by correcting that EGR flow rate with an estimated value of exhaust temperature.

(2) In such a construction that the EGR flow rate is diagnosed through comparison of a diagnosis parameter determined from the intake pressure, obtained when an EGR valve is open, with a predetermined determination threshold value, the following operation is performed: the above-mentioned diagnosis parameter or determination threshold value is corrected based on an estimated value of exhaust temperature. Possible diagnosis parameters include, for example, the amount by which the intake pressure varies when the EGR valve is transitioned from closed state to open state. However, the intake pressure obtained when the EGR valve is kept in open state may be used as a diagnosis parameter. Thus, the EGR flow rate can be diagnosed even when the EGR flow rate is changed with change in exhaust temperature and further the amount of change in intake pressure (e.g., detected value) is varied.

(3) In such a construction that the EGR flow rate is diagnosed through comparison of the pressure difference between the upstream side and the downstream side of an EGR valve with a predetermined determination threshold value, the following operation is performed: the pressure difference between the upstream side and the downstream side of the EGR valve or the above-mentioned determination threshold value is corrected based on an estimated value of exhaust temperature. Thus, the EGR flow rate can be diagnosed with accuracy even when the EGR flow rate is changed with change in exhaust temperature and further the pressure difference between the upstream side and the downstream side of the EGR valve is varied.

(4) In such a construction that the opening of an EGR valve is controlled to maintain a desired EGR rate, the opening of the EGR valve is corrected based on an estimated value of exhaust temperature. Thus, a desired EGR rate can be maintained even when the exhaust temperature changes.

When an anomaly (failure) occurs in at least any of a gas sensor, a heater, a temperature detecting unit, and an energization controlling unit, the element temperature or a parameter in correlation thereto becomes unknown, and exhaust temperature estimation becomes inaccurate. Therefore, it is advisable to avoid carrying out correction described under any of the above items (1) to (4) when the gas sensor or the like is anomalous.

When consideration is given to carrying out high-load fuel quantity increase in an internal combustion engine utilizing the exhaust temperature information of the internal combustion engine, the exhaust temperature itself need not be estimated. Instead, the fuel quantity increase may be corrected based on the element temperature or a parameter in correlation thereto. Specifically, it is advisable to reduce the fuel quantity increase when the element temperature (or a parameter in correlation thereto) is low. Thus, optimal fuel quantity increase can be carried out, and various problems, such as degradation in fuel economy due to excessive fuel quantity increase and the emission of unburned fuel (HC), can be solved.

When an anomaly (failure) occurs in at least any of a gas sensor, a heater, a temperature detecting unit, and an energization controlling unit, the element temperature, or a parameter in correlation thereto becomes unknown, and exhaust temperature estimation becomes inaccurate. Therefore, it is advisable to avoid correcting the fuel quantity increase when the gas sensor or the like is anomalous.

BRIEF DESCRIPTION OF THE DRAWINGS

The above and other objects, features, and advantages of the present invention will become more apparent from the following detailed description made with reference to the accompanying drawings. In the drawings.

DETAILED DESCRIPTION OF THE PREFERRED EMBODIMENTS

Figure 1:
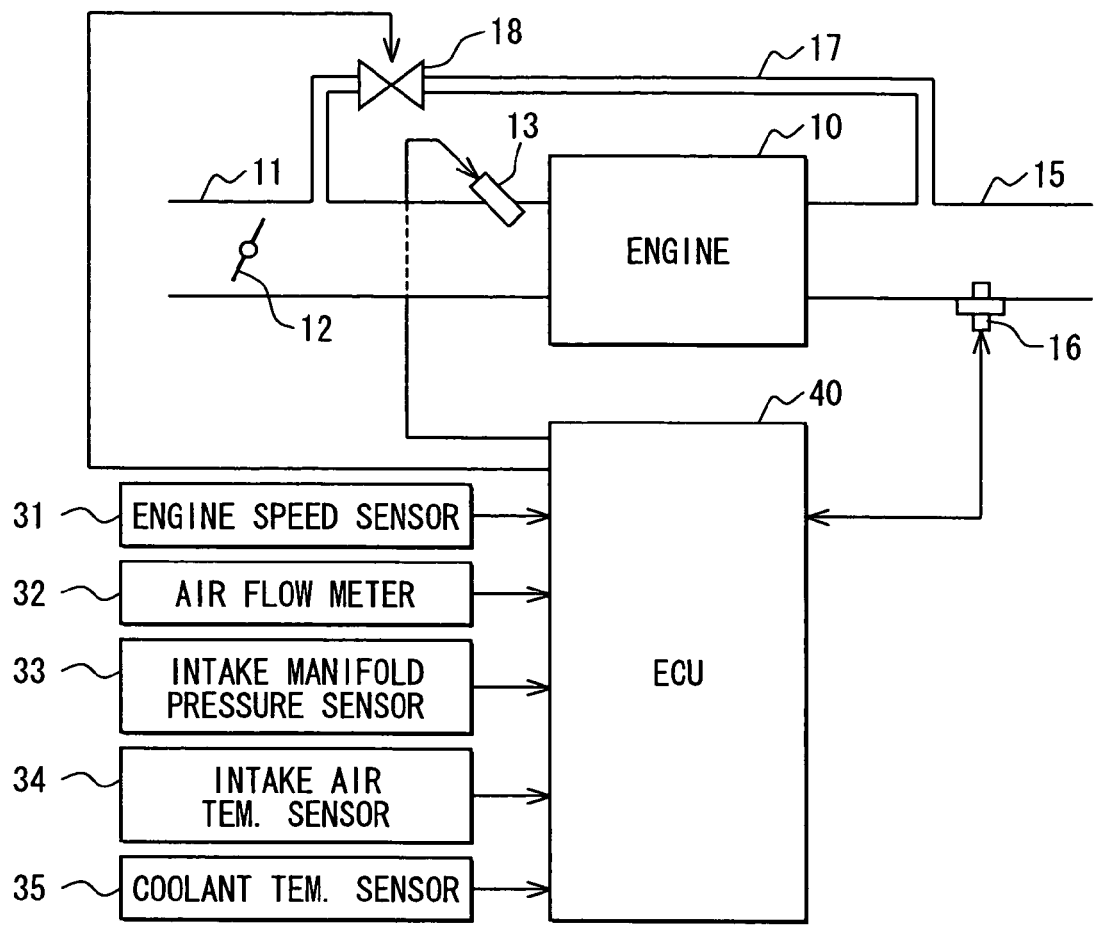
FIG. 1 is a schematic diagram illustrating the outline of an engine control system in an embodiment of the invention.

Hereafter, description will be given to an embodiment in which the present invention is incarnated with reference to the drawings. FIG. 1 is a schematic diagram illustrating the outline of an engine control system. In FIG. 1, an engine 10 is a multi-cylinder gasoline engine. Its intake pipe 11 is provided with a throttle valve 12, and an injector 13 is provided in proximity to an intake port on the downstream side thereof. When fuel is injected from the injector 13, an air-fuel mixture is formed of the injected fuel and air. The air-fuel mixture is burned in the combustion chamber of the engine, and then exhaust is discharged to an exhaust pipe 15. An A/F (Air/Fuel) sensor 16 for detecting an air-fuel ratio is installed in the exhaust pipe 15. As an EGR (Exhaust Gas Recirculation) unit, an EGR passage 17 is provided to connect the intake pipe 11 and the exhaust pipe 15, and an EGR valve 18 is provided at a certain midpoint in the EGR passage 17.

Figure 2:
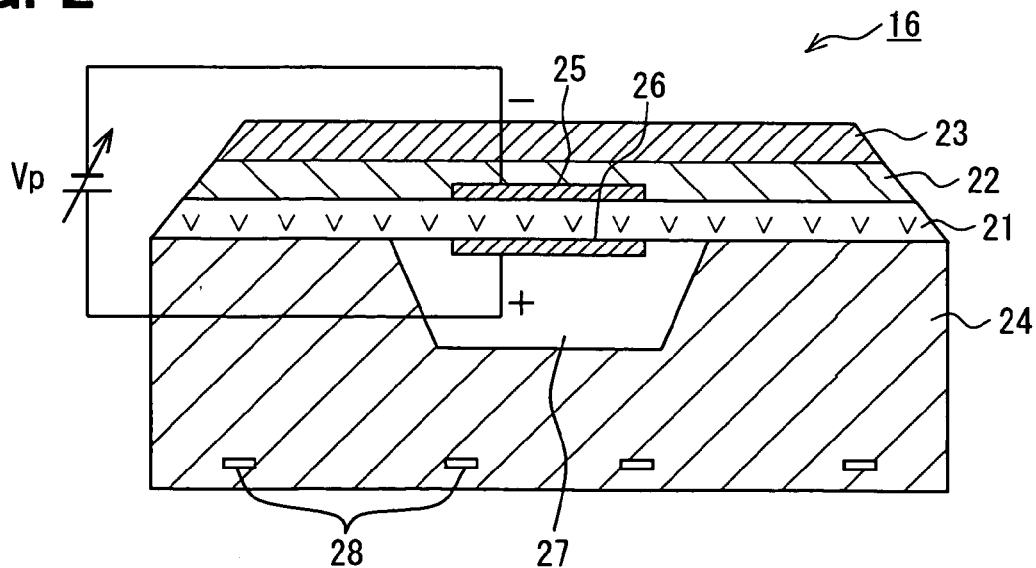
FIG. 2 is a sectional view illustrating the configuration of an A/F sensor.

Here, description will be given to the configuration of the A/F sensor 16 with reference to FIG. 2. The A/F sensor 16 has a sensor element of laminated structure, and FIG. 2 shows the sectional configuration of the sensor element. In reality, the sensor element is long and extends in the direction orthogonal to the plane of FIG. 2, and it is so constructed that it is entirely housed in a housing or an element cover, The A/F sensor 16 (sensor element) has a solid electrolyte layer 21, a diffusion resistance layer 22, a shielding layer 23, and an insulating layer 24, and it is so constructed that these layers are vertically laminated in the direction of the plane of the figure. The rectangular plate-like solid electrolyte layer 21 is a sheet made of partially stabilized zirconia, and a pair of electrodes 25 and 26 are vertically disposed opposite to each other with the solid electrolyte layer 21 sandwiched between them. The electrodes 25 and 26 are formed of platinum Pt or the like. The diffusion resistance layer 22 is composed of a porous sheet for guiding exhaust to the electrode 25, and the shielding layer 23 is composed of a dense layer for suppressing the transmission of exhaust. These layers 22 and 23 are both formed by molding ceramic, such as alumina and zirconia, by a sheet forming technique or the like. They are different from each other in gas permeability according to differences in the average pore size of porosity and void content.

The insulating layer 24 is composed of ceramic, such as alumina and zirconia, and an atmospheric duct 27 is formed in the area thereof opposite the electrode 26. A heater 28 formed of platinum Pt or the like is buried in the insulating layer 24. The heater 28 is formed of a filamentary heating element that produces heat by power application from a battery power source, and heats the entire element by the produced heat. The heater 28 need not be so constructed that it is buried in the insulating layer 24 (it is built in the sensor element), and it may be so constructed that it is external to the sensor element.

In the above-mentioned A/F sensor 16, the exhaust around it is let in through the lateral portions of the diffusion resistance layer 22, and arrives at the diffusion layer-side electrode 25. In a case where the exhaust is a lean atmosphere, oxygen in the exhaust is decomposed and ionized at the diffusion layer-side electrode 25 by voltage application to between the electrodes 25 and 26. The ionized oxygen passes through the solid electrolyte layer 21, and then discharged from the atmosphere-side electrode 26 to the atmospheric duct 27. At this time, an element current flows in the direction from the atmosphere-side electrode 26 to the diffusion layer-side electrode 25. In a case where the exhaust is a rich atmosphere, conversely, oxygen in the atmospheric duct 27 is decomposed and ionized at the atmosphere-side electrode 26. The ionized oxygen passes through the solid electrolyte layer 21, and is discharged from the diffusion layer-side electrode 25. It is then brought into catalytic reaction with unburned components, such as HC and CO, in the exhaust. At this time, an element current flows in the direction from the diffusion layer-side electrode 25 to the atmosphere-side electrode 26.

ECU (Electronic Control Unit) 40 is constructed mainly of a microcomputer consisting of CPU, ROM, RAM, and the like as publicly known. The detection signals of various sensors and the like are inputted to the ECU 40. In addition to the above-mentioned A/F sensor 16, such sensors include: an engine speed sensor 31 for detecting the number of engine revolutions; an air flow meter (intake air quantity sensor) 32 for detecting intake air quantity; an intake manifold pressure sensor 33 for detecting the pressure in the intake pipe; an intake air temperature sensor 34 for detecting the temperature of intake air; a coolant temperature sensor 35 for detecting the temperature of engine cooling water; and the like. The ECU 40 executes various control programs stored in the ROM, and thereby carries out varied control on the engine 10 according to the operating state of the engine on each occasion. More specific description will be given. Based on various detection signals inputted from time to time, the ECU 40 computes injection quantity, ignition timing, and the like, and controls the operation of the injector 13, an ignition device, and the like based on the result of computation. With respect to fuel injection control, especially, the ECU detects an air-fuel ratio based on the element current passed through the A/F sensor 16, and feedback controls the injection quantity so that the detected air-fuel ratio agrees with a target air-fuel ratio.

For accurately detecting an air-fuel ratio with the A/F sensor 16, it is required to keep the sensor 16 in a predetermined active state. The ECU 40 carries out energization control on the heater 28 based on the element temperature of the A/F sensor 16. That is, heater energization control is carried out so that the element temperature becomes equal to a predetermined target temperature (e.g., 750° C.). In this case, the element impedance is detected as a parameter in correlation to the element temperature. Heater energization is controlled by a control duty ratio (also referred to as "heater duty") computed based on the difference between that detected value of impedance and a target value.

Though not shown in the figure, the heater 28 is connected in series with a battery and a switching element constructed of a transistor and the like, and energization of the heater is on/off-controlled by the switching element being duty-controlled.

When consideration is given to heat balance at the A/F sensor 16, the following can be concluded with respect to the quantity of heat supplied from the heater 28 to the sensor element per unit time (hereafter, referred to as "heater supplying heat quantity Qheat") and the quantity of heat robbed by exhaust per unit time (hereafter, referred to as "emitted heat quantity Qlost"): with the sensor kept in an active state, the heater supplying heat quantity Qheat and the emitted heat quantity Qlost are kept in balance. That is, letting heater applied voltage be V, heater resistance R, control duty ratio (the amount of operation) Duty, and a coefficient for conversion from power [W] to heat quantity [J/sec] C, the heater supplying heat quantity Qheat can be expressed by Expression (3) below.

$$Q\text{heat}=C*V^2/R*\text{Duty} \tag{3}$$

Letting element temperature be Ts, exhaust temperature Texh, and proportional coefficient K, the emitted heat quantity Qlost can be expressed by Expression (4) below.

$$Q\text{lost}=K*(Ts-Texh) \tag{4}$$

In this case, when it is considered that Qheat=Qlost, "Qheat=K*(Ts−Texh)." When the heater supplying heat quantity Qheat and the element temperature Ts are known in this relational expression, the exhaust temperature Texh can be estimated. The heater resistance R is equivalent to "heat release quantity-related parameter," and the proportional coefficient K is equivalent to "emitted heat quantity-related parameter."

Figure 3:
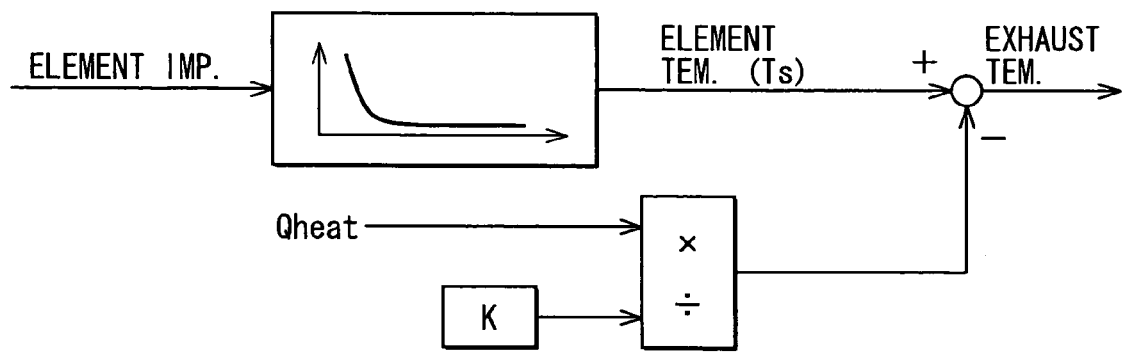
FIG. 3 is a block diagram illustrating the basic principle underlying exhaust temperature estimation.
Figure 4:
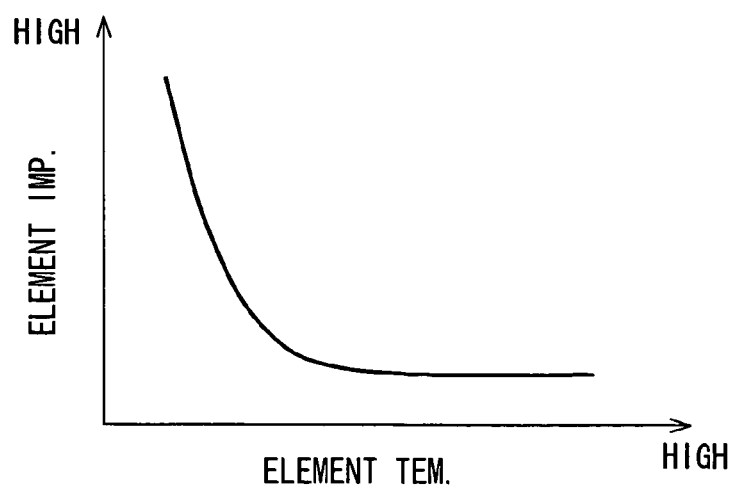
FIG. 4 is a drawing illustrating the correlation between element temperature and element impedance.

FIG. 3 is a block diagram illustrating the basic principle underlying exhaust temperature estimation. Here, the element temperature and the element impedance are in correlation illustrated in FIG. 4, and in the example illustrated in FIG. 3, the element impedance is converted into the element temperature using the relation illustrated in FIG. 4. The exhaust temperature is estimated by "(element temperature−heater supplying heat quantity)/K." The element impedance is equivalent to "parameter in correlation to element temperature."

Figure 5:
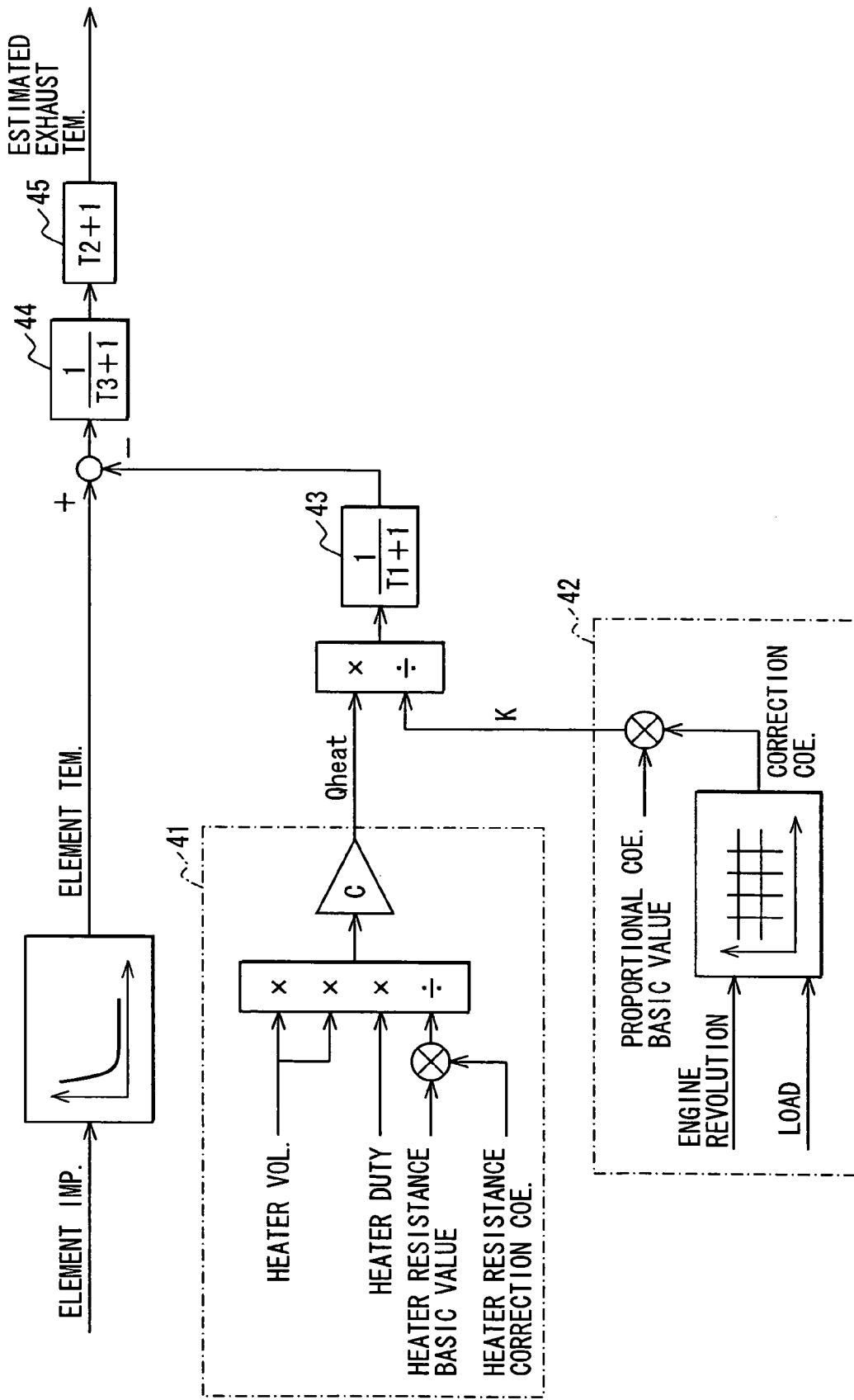
FIG. 5 is a block diagram illustrating an arithmetic logic for exhaust temperature estimation.

FIG. 5 is a block diagram representing the block diagram in FIG. 3 as a more specific arithmetic logic. In FIG. 5, a heater heat quantity computation unit 41 computes the heater supplying heat quantity Qheat based on the relation expressed by Expression (3) above. In computation of the heater resistance R, especially, the heater resistance correction coefficient is set so as to cope with variation in heater resistance R between individual units and the like. The heater resistance (=basic value of heater resistance*heater resistance correction coefficient), obtained by correction using that correction coefficient, is taken as a parameter for computing the heater supplying heat quantity Qheat.

It is desirable that the proportional coefficient K should be variably set according to the exhaust flow velocity or exhaust density on each occasion. Consequently, a proportional coefficient computation unit 42 uses the number of engine revolutions as a parameter in correlation to exhaust flow velocity and the load (intake air quantity) as a parameter in correlation to exhaust density. It computes the correction coefficient based on the number of engine revolutions or the load. Then, the product of that correction coefficient and the basic value of proportional coefficient is taken as the ultimate proportional coefficient K.

The element temperature changes with a predetermined delay relative to variation in heater duty (heater supplying heat quantity Qheat). For this reason, it is required to take into account the transient response of element temperature to change in heater duty. In the example illustrated in FIG. 5, delay correction is carried out on the heater supplying heat quantity Qheat with time constant T1 equivalent to a delay in change in element temperature relative to variation in heater duty (numeral 43 in the figure).

With respect to the estimated value of exhaust temperature, a filtering process is performed to remove noise. Further, advance correction is carried out with time constant T2 equivalent to a delay in change in element temperature relative to change in exhaust temperature (numerals 44 and 45 in the figure). However, there is a relation expressed as T3<<T2 between time constants T2 and T3 in the figure.

As mentioned above, the heater resistance R as a parameter for computing the heater supplying heat quantity Qheat is corrected with the heater resistance correction coefficient to cope with variation between individual units and the like. It is expected that the degree of correction fluctuates due to variation with time and the like. To cope with this, calibration of the heater resistance correction coefficient is carried out as a parameter calibration process. Here, the actual value of heater resistance computed based on Expression (3) above and the like in such a state that the element temperature is known, is compared with the basic value of heater resistance. Then, the heater resistance correction coefficient is updated based on the result of comparison. The updated heater resistance correction coefficient is stored and held in memory for backup, such as standby RAM, provided in the ECU 40.

The parameter calibration process is for calibrating the heater resistance R as a heat release quantity-related parameter. In this embodiment, as the result of the heater resistance correction coefficient being calibrated, the heater resistance R is calibrated.

Figure 6:
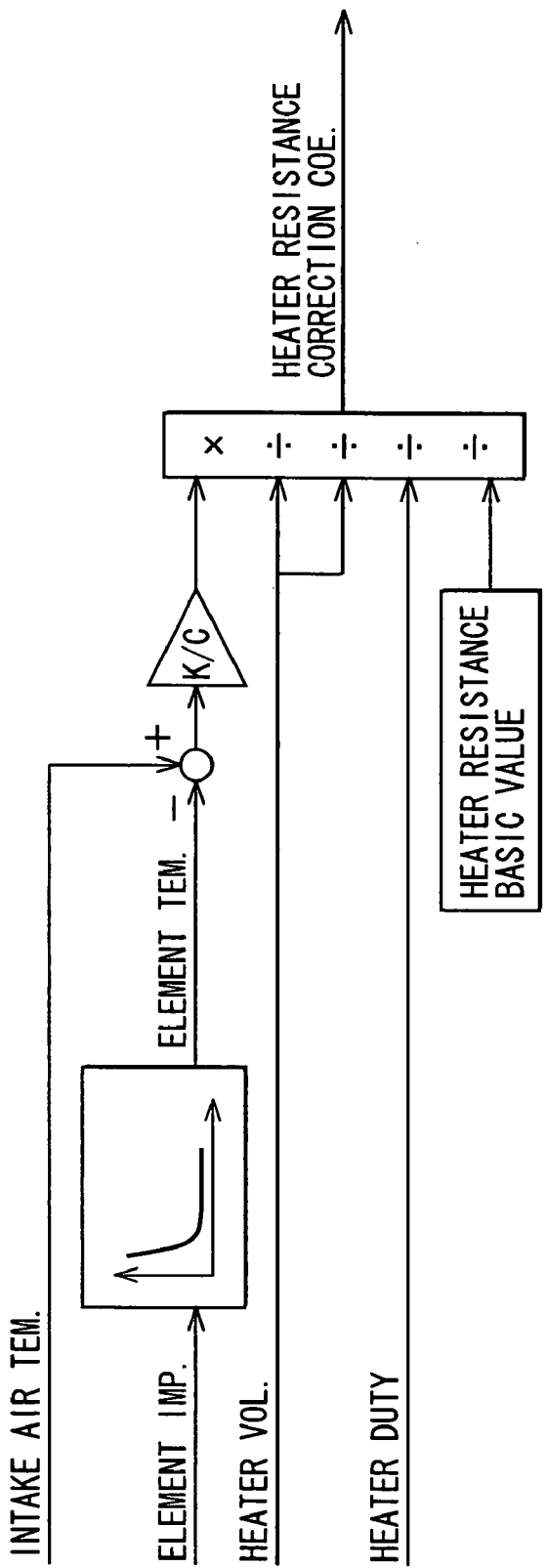
FIG. 6 is a block diagram illustrating an arithmetic logic for computing a heater resistance correction coefficient.

FIG. 6 is a block diagram for explaining the outline of parameter calibration. In this embodiment, parameter calibration is carried out in a state in which the exhaust temperature is equal to the intake air temperature (i.e., the engine's cold stop state), and the difference between element temperature and intake air temperature is computed. Then, the actual value of heater resistance is computed from this temperature difference, heater applied voltage, and heater duty. Then, the heater resistance correction coefficient is computed through comparison of the actual value of heater resistance with the basic value of heater resistance.

Figure 7:
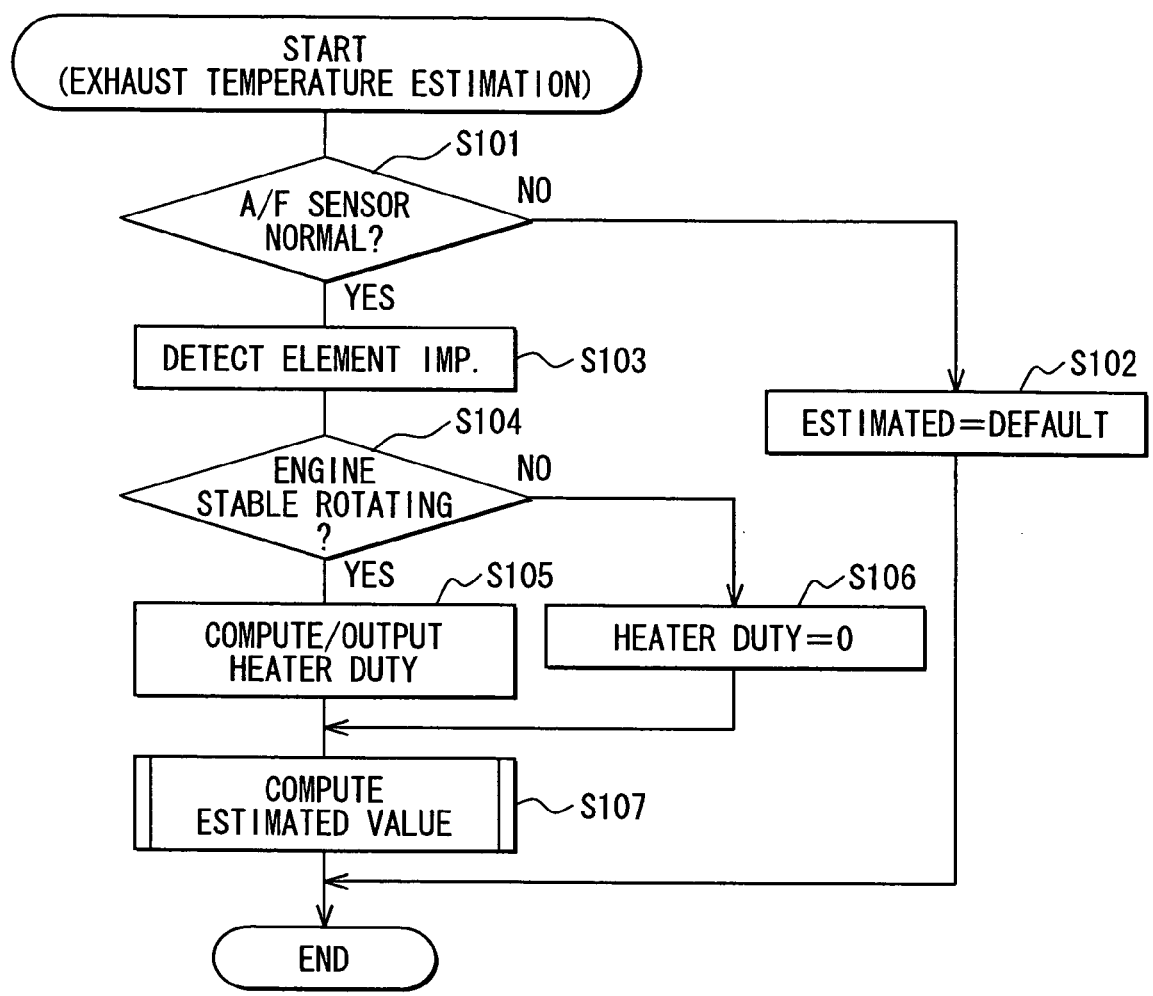
FIG. 7 is a flowchart illustrating an exhaust temperature estimation process.
Figure 8:
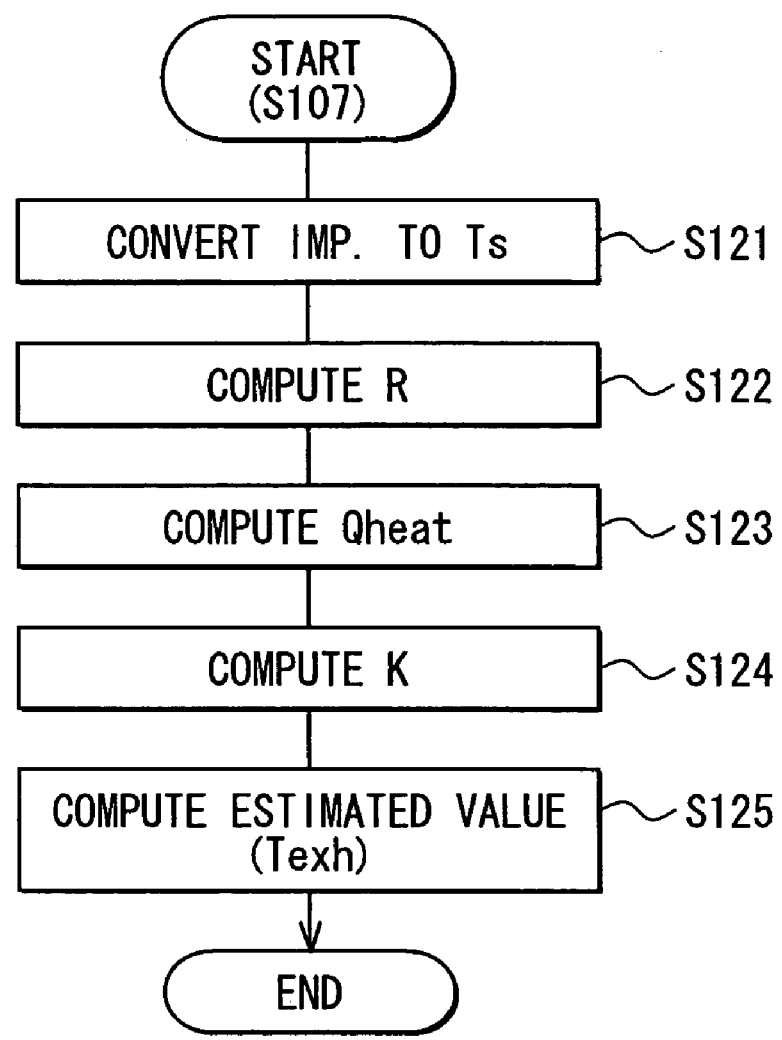
FIG. 8 is a flowchart illustrating a subroutine for computing an estimated value of exhaust temperature.
Figure 9:
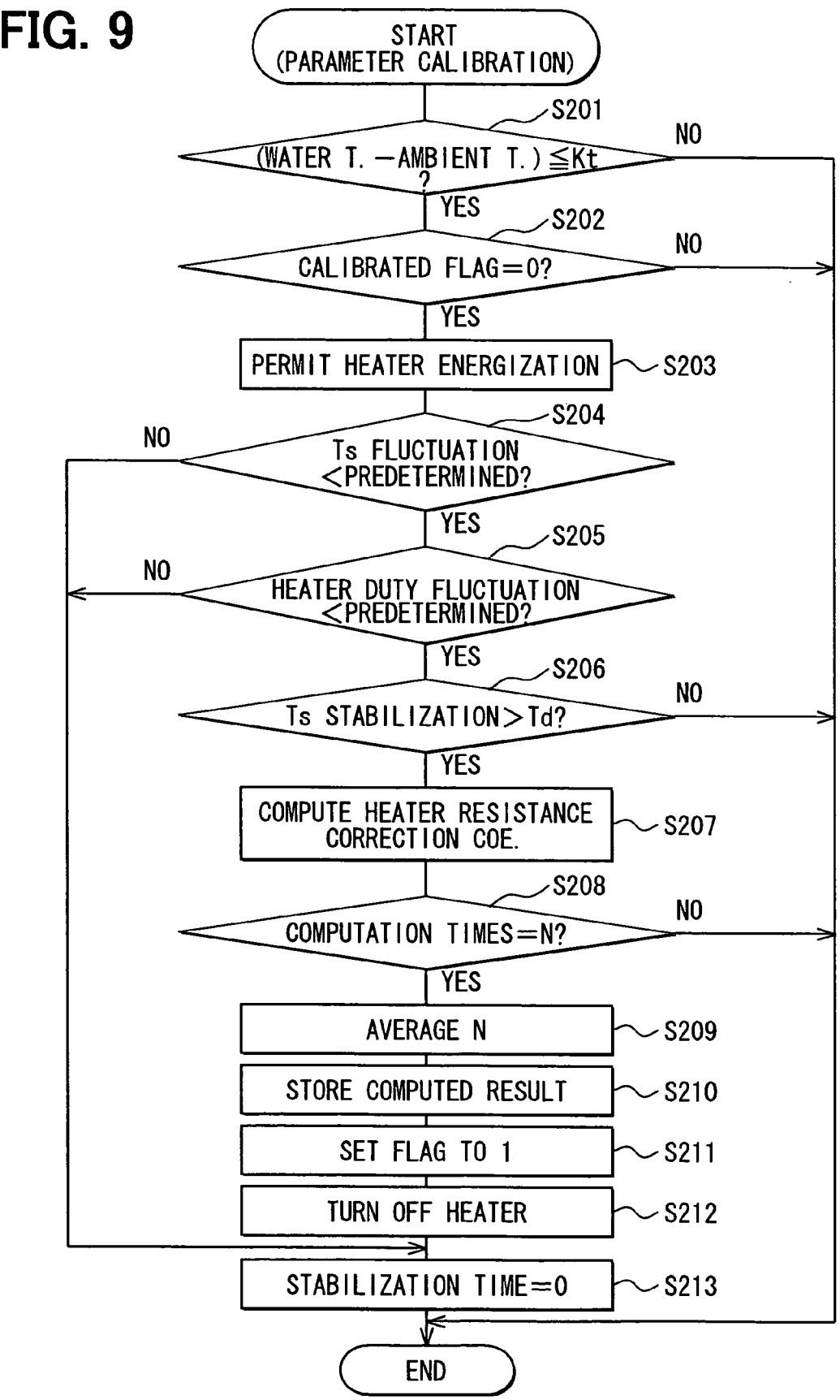
FIG. 9 is a flowchart illustrating a parameter calibration process.

Description will be given to processing programs associated with exhaust temperature estimation carried out by the ECU 40 with reference to the flowcharts in FIG. 7 to FIG. 9. FIG. 7 is a flowchart illustrating an exhaust temperature estimation process; FIG. 8 is a flowchart illustrating a subroutine for computing an estimated value of exhaust temperature; and FIG. 9 is a flowchart illustrating a parameter calibration process.

The ECU 40 starts the process of FIG. 7 with a predetermined time cycle. At Step S101, it determines whether the A/F sensor 16 and the like are in order. That is, the ECU determines whether the A/F sensor 16 and the heater 28 associated therewith are free from failure and whether the processing units related to element temperature detection and heater energization are free from anomalies. In a case where the A/F sensor 16 or the like is faulty, the operation proceeds to Step S102, and a predetermined default value is taken as the estimated value of exhaust temperature. It is advisable to determine the default value based on the operating state of the engine on each occasion by referring to a predetermined map or the like. On condition that the A/F sensor 16 and the like are normal, exhaust temperature estimation is carried out at the steps described below.

That is, at Step S103, the element impedance of the A/F sensor 16 is detected. Brief description will be given to a method for detecting the element impedance. Each time a predetermined impedance detection time periodically comes, the ECU 40 switches the sensor applied voltage from a present voltage value for air-fuel ratio detection to a voltage value for impedance detection in an alternating current-like manner. Thus, alternating current-like change of, for example, 1 kHz to 20 kHz or so is made to the sensor applied voltage, and the element current varies in response to this alternating current-like voltage change. Then, the element impedance is computed from variation in voltage $\Delta V$ and variation in current $\Delta I$ at that time (element impedance=$\Delta V/\Delta I$).

At Step S104, it is determined whether the engine 10 is presently in a stable rotating state. When the number of engine revolutions >400 rpm, for example, affirmative determination is made at Step S104. When the determination at Step S104 is affirmative, the operation proceeds to Step S105, and a heater duty computation and output process is carried out. In this case, the heater duty is computed based on the difference between the element impedance computed as mentioned above and a target impedance, using a PID control technique, for example. Heater energization is carried out with this heater duty, and the A/F sensor 16 is kept in a desired active state. (The element temperature is kept at a target temperature.) When the determination at Step S104 is negative, the operation proceeds to Step S106, and the heater duty is set to 0. That is, heater energization is not carried out.

At Step S107, an estimated value of exhaust temperature is computed. Detailed description will be given to a process to compute an estimated value of exhaust temperature with reference to the flowchart in FIG. 8.

At Step S121 in FIG. 8, the element impedance computed as mentioned above is converted into element temperature Ts. At Step S122, the heater resistance R is computed by multiplying together the basic value of heater resistance and the heater resistance correction coefficient read from the standby RAM. At Step S123, the heater supplying heat quantity Qheat is computed by Expression (3) above. At Step S124, the proportional coefficient K is computed by multiplying together the basic value of proportional coefficient and the correction coefficient computed based on the operating state (number of engine revolutions, load) of the engine on each occasion.

At Step S125, an estimated value of exhaust-temperature is computed. At this time, the estimated value of exhaust temperature (Texh) is basically computed based on the computed element temperature Ts, heater supplying heat quantity Qheat, and proportional coefficient K, using the above-mentioned relation expressed as "Qheat=K*(Ts−Texh)." As described above with reference to FIG. 5, however, it is advisable to compute the estimated value of exhaust temperature by taking the following procedure: a delay of element temperature relative to heater duty and a delay of element temperature relative to change in exhaust temperature are taken into account, and delay correction or advance correction is carried out as appropriate.

The parameter calibration process illustrated in FIG. 9 is carried out by the ECU 40 with an ignition switch (also referred to as "IG switch") kept off. In this process, the heater resistance correction coefficient is updated as parameter calibration. For example, the process of FIG. 9 is carried out as follows: the time that has lapsed after the engine is stopped (after the IG switch is turned off) is measured using a soak timer or the like; when the lapsed time reaches a predetermined time, power is temporarily supplied to the ECU 40 to effect the process. The following construction may be adopted: even after the IG switch is turned off, power supply to the ECU 40 is sustained, and after the process of FIG. 9 is completed, power supply to the ECU 40 is stopped.

At Step S201 in FIG. 9, it is determined whether the difference between engine water temperature and ambient temperature is not more than a predetermined value Kt. This Kt is a threshold value for determining whether the engine has been cooled down to a cold state after the engine is stopped, and a temperature of 5° C., 10° C., or so is acceptable for Kt. In a case where the determination at Step S201 is affirmative, it can be determined that the exhaust temperature (i.e., the temperature in the exhaust pipe) at that time substantially agrees with the detected value (intake air temperature) of the intake air temperature sensor 34. At Step S202, a "calibrated" flag is checked to determine whether the "calibrated" flag, which indicates that parameter calibration has not been completed, is set to 0. When the determination at Step S201 or S202 is negative, this process is terminated.

When the determination at Step S201 and that at S202 are both affirmative, the operation proceeds to Step S203. At Step S203, heater energization is permitted. As the result of the permission of heater energization, a heater duty computation and output process (not shown) is carried out. With the heater being energized, the element temperature is kept at the target temperature.

At Step S204, it is determined whether fluctuation in element temperature is less than a predetermined value, and at Step S205, it is determined whether fluctuation in heater duty is less than a predetermined value. Steps S204 and S205 are for determining whether the element temperature and the heater duty are stabilized after heater energization is started. In a case where the element temperature or the heater duty is unstable and the determination at Step S204 or S205 is negative, the operation proceeds to Step S213. The time that has lapsed after heater energization is started and then the element temperature is stabilized (element temperature stabilization time) is zeroed.

In a case where the element temperature and the heater duty are stable and the determination at Step S204 and that at S205 are both affirmative, the operation proceeds to Step S206, and it is determined whether the element temperature stabilization time has become larger than a predetermined time Td. The predetermined time Td is, for example, 1 second or so. When the element temperature stabilization time≦Td, this process is terminated.

When the element temperature stabilization time>Td, the operation proceeds to Step S207, and computation of heater resistance correction coefficient is carried out. This computation is equivalent to the process described above with reference to FIG. 6, and the following operation is performed: in a state in which the exhaust temperature becomes equal to the intake air temperature (i.e., the engine's cold stop state), the actual value of heater resistance is computed from the difference between element temperature and intake air temperature, heater applied voltage, and heater duty; further, the heater resistance correction coefficient is computed through comparison of that actual value of heater resistance with the basic value of heater resistance.

At Step S208, it is determined whether the number of times of heater resistance correction coefficient computation has become equal to a predetermined value N. When the determination at this step is affirmative, the operation proceeds to Step S209. At Step S209, the ultimate value of heater resistance correction coefficient is computed by averaging N computed values of heater resistance correction coefficient. At Step S210, the computed ultimate value of heater resistance correction coefficient is stored in the standby RAM.

At Step S211, 1 is set in the "calibrated" flag, and at Step S212, heater energization is stopped. At Step S213, the element temperature stabilization time is zeroed. The "calibrated" flag is cleared immediately before power supply to the ECU 40 is interrupted.

Figure 10:
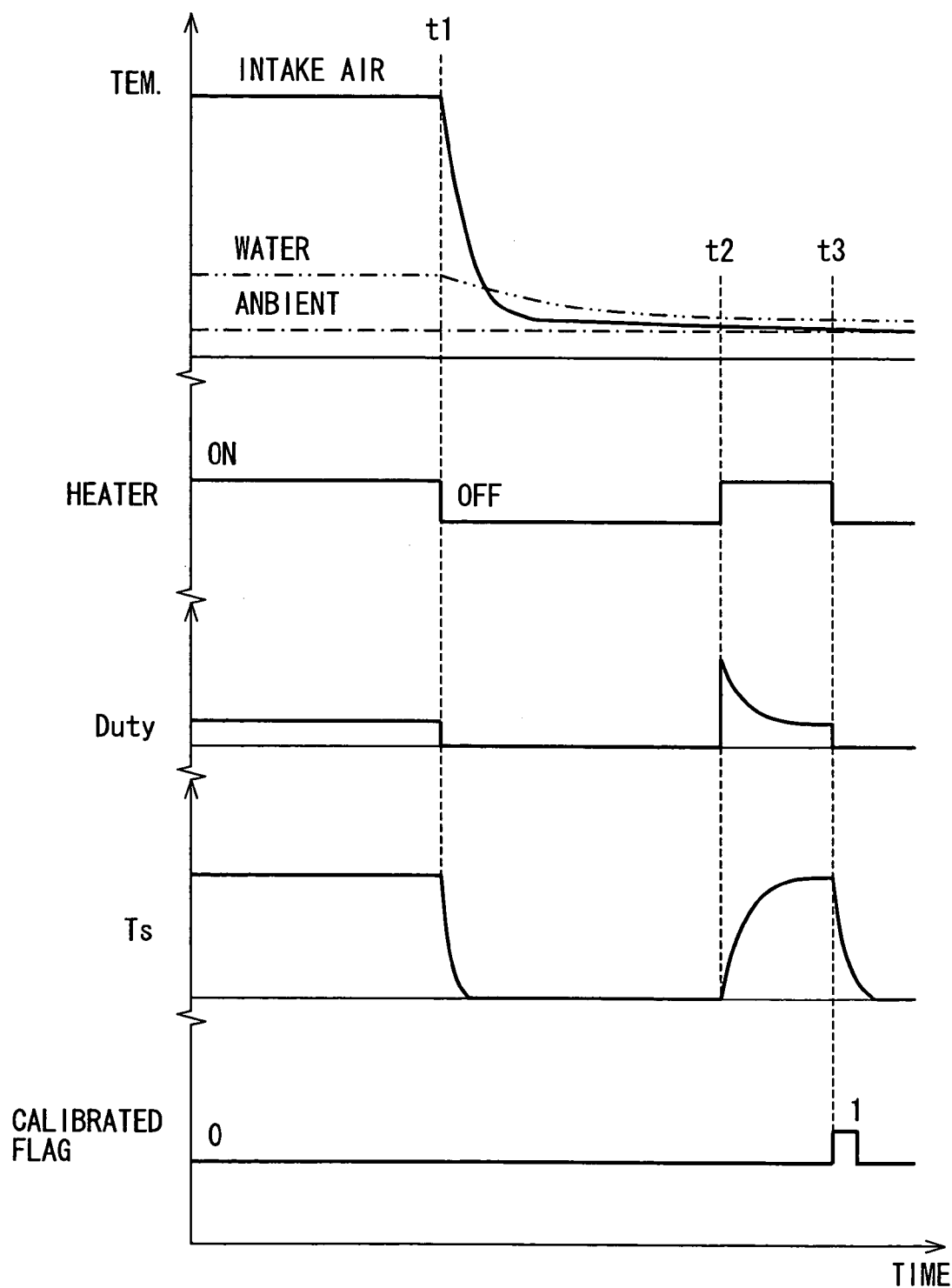
FIG. 10 is a time diagram illustrating the procedure for parameter calibration.

FIG. 10 is a time diagram illustrating the procedure for parameter calibration. Time t1 in the figure indicates the time when the engine is stopped.

When the IG switch is turned off at time t1 to stop the engine, the exhaust system temperature and the water temperature start to lower as illustrated in the figure. Also, at time t1, energization of the heater for the A/F sensor 16 is stopped.

When the difference between water temperature and intake air temperature thereafter becomes less than a predetermined value Kt at time t2, the parameter calibration process is started, and the heater resistance correction coefficient is updated as mentioned above. More specific description will be given. In a state in which the element temperature is settled in proximity to the target temperature by heater energization, the actual value of heater resistance is computed from the difference between element temperature and intake air temperature, heater applied voltage, and heater duty. Further, the heater resistance correction coefficient is computed through comparison of that actual value of heater resistance with the basic value of heater resistance. The computed heater resistance correction coefficient is stored and held in the standby RAM.

At time t3 when updating of the heater resistance correction coefficient is completed, 1 is set in the "calibrated" flag, and heater energization is stopped. However, the "calibrated" flag is cleared to 0 by power supply to the ECU 40 being interrupted after the completion of the parameter calibration process.

Figure 11:
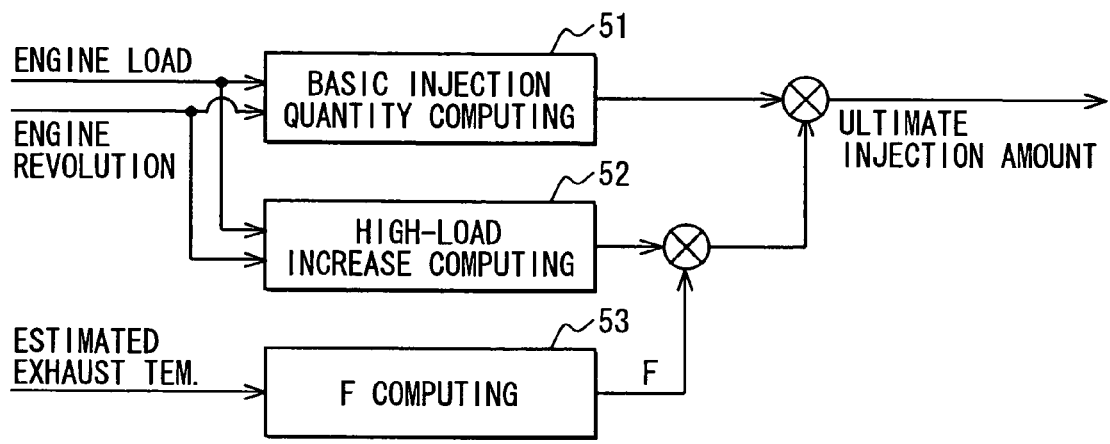
FIG. 11 is a block diagram illustrating the outline of high-load increase in injection quantity.
Figure 12:
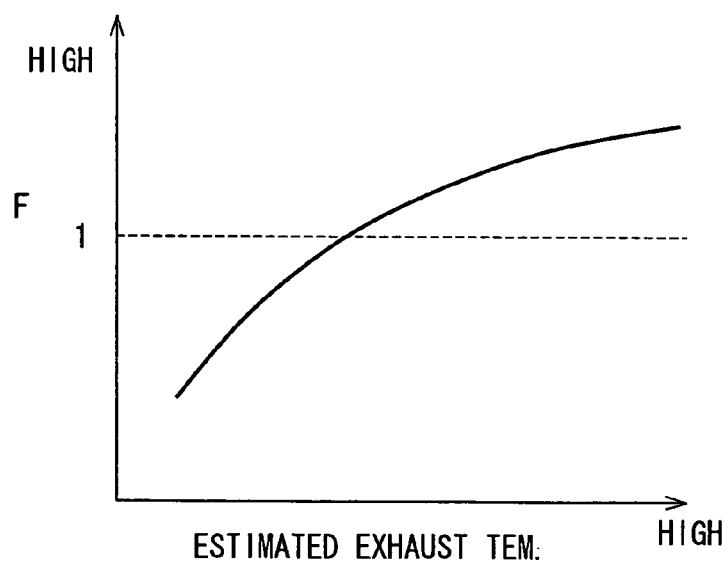
FIG. 12 is a drawing illustrating the relation between estimated value of exhaust temperature and coefficient F.

The estimated value of exhaust temperature computed as mentioned above is used to correct the fuel quantity increase in high-load increase in injection quantity. More specific description will be given with reference to the block diagram in FIG. 11. A basic injection quantity computing unit 51 computes a basic injection quantity based on the engine load and the number of engine revolutions. A high-load increase computing unit 52 computes a high-load increase correction coefficient based on the engine load and the number of engine revolutions during the high-load operation of the engine 10. A correction coefficient computing unit 53 computes a coefficient F for correcting the high-load increase correction coefficient based on the estimated value of exhaust temperature on each occasion. At this time, using the relation illustrated in FIG. 12, for example, the computing unit computes the coefficient F so that it is decreased with decrease in estimated value of exhaust temperature and increased with increase in estimated value of exhaust temperature. Then, the ultimate injection quantity is computed by multiplying together the high-load increase correction coefficient after correction (=high-load increase correction coefficient before correction*coefficient F) and the basic injection quantity.

After the fuel quantity increase is corrected based on the estimated value of exhaust temperature, optimal fuel quantity increase can be carried out, and various problems, such as degradation in fuel economy due to excessive fuel quantity increase and the emission of unburned fuel (HC), can be solved. More specific description will be given. The high-load increase computing unit 52 computes the high-load increase correction coefficient using map data matched under worst conditions under which, for example, the exhaust temperature is raised (a state in which the ambient temperature becomes the highest temperature or the like). Therefore, the fuel quantity increase can be excessively carried out beyond a normally required quantity. However, optimal fuel quantity increase can be carried out by correcting the fuel quantity increase based on the estimated value of exhaust temperature, as mentioned above. In a case where the A/F sensor 16 or the heater 28 associated therewith becomes faulty or any trouble occurs in a processing unit related to element temperature detection or heater energization, the element temperature or a parameter in correlation thereto becomes unknown, and exhaust temperature estimation becomes inaccurate. Therefore, it is advisable to avoid correcting the fuel quantity increase by the estimated value of exhaust temperature when the A/F sensor 16 or the like is anomalous.

Figure 13:
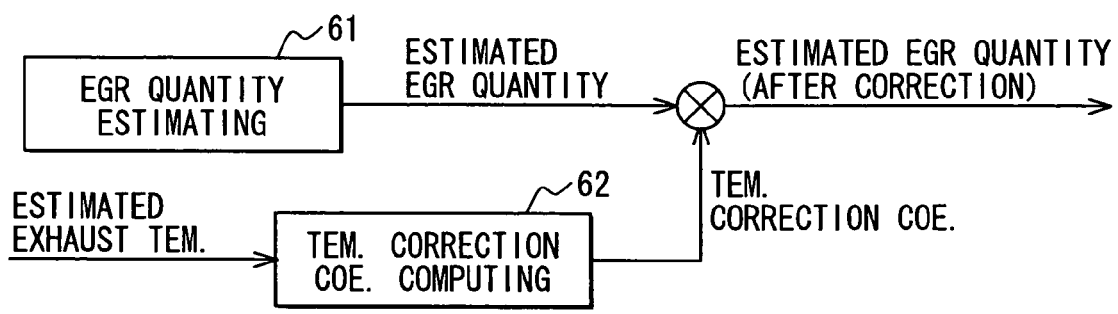
FIG. 13 is a block diagram illustrating the outline of EGR quantity estimation.
Figure 14:
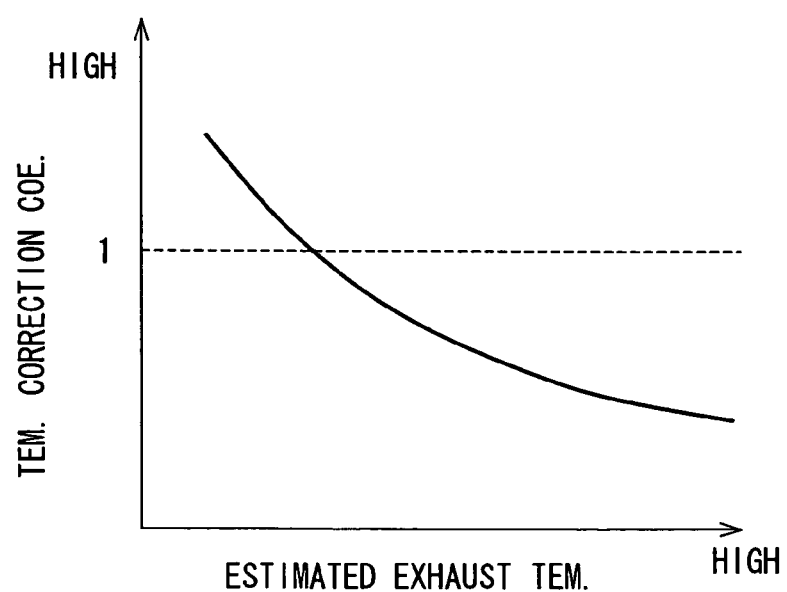
FIG. 14 is a drawing illustrating the relation between estimated value of exhaust temperature and temperature correction coefficient.

An estimated value of EGR flow rate may be corrected based on an estimated value of exhaust temperature. More specific description will be given with reference to the block diagram in FIG. 13. An EGR quantity estimating unit 61 computes an estimated value of EGR quantity based on the operating state of the engine and the like. A temperature correction coefficient computing unit 62 computes a temperature correction coefficient based on an estimated value of exhaust temperature. At this time, using the relation illustrated in FIG. 14, for example, the computing unit computes the temperature correction coefficient so that it is increased with decrease in estimated value of exhaust temperature and decreased with increase in estimated value of exhaust temperature. Then, the ultimate estimated value of EGR quantity is computed by multiplying together the estimated value of EGR quantity and the temperature correction coefficient.

More specific description will be given. The EGR quantity is varied according to the exhaust temperature. However, the EGR quantity can be determined with accuracy by correcting that EGR quantity based on the estimated value of exhaust temperature.

Figure 15:
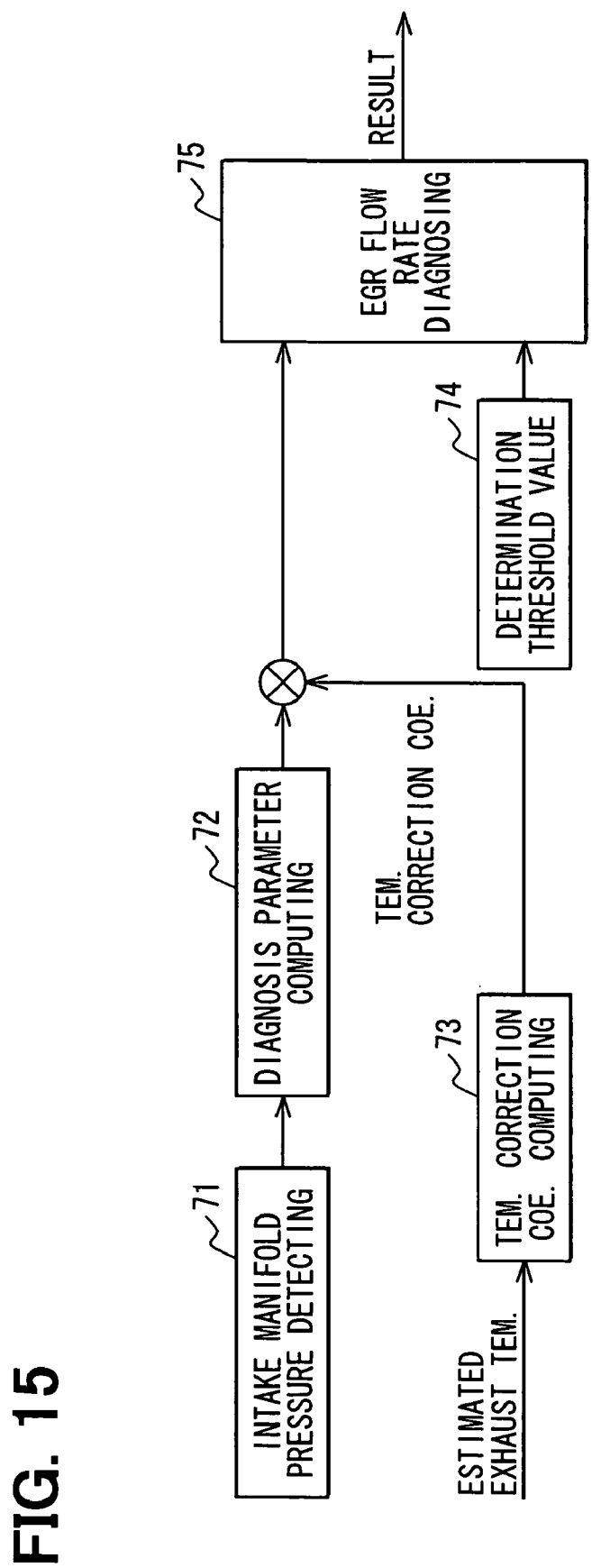
FIG. 15 is a block diagram illustrating the outline of EGR flow rate diagnosis.

There may be a construction that the EGR flow rate is diagnosed through comparison of a diagnosis parameter, which is determined from an intake pressure obtained when an EGR valve is open, with a predetermined determination threshold value. Here, the diagnosis parameter may be corrected based on an estimated value of exhaust temperature. Possible diagnosis parameters include, for example, the amount by which the intake pressure varies when the EGR valve is transitioned from closed state to open state. More specific description will be given with reference to FIG. 15. An intake manifold pressure detecting unit (intake manifold pressure sensor) 71 detects the pressure in the intake pipe. A diagnosis parameter computing unit 72 computes a diagnosis parameter (e.g., the amount by which the intake pressure varies when the EGR valve is transitioned from closed state to open state) based on an intake manifold pressure. A temperature correction coefficient computing unit 73 computes a temperature correction coefficient based on an estimated value of exhaust temperature. At this time, it computes the temperature correction coefficient using the relation illustrated in FIG. 14, for example. The coefficient computing unit computes a diagnosis parameter after correction by multiplying together the diagnosis parameter and the temperature correction coefficient. A determination threshold value computing unit 74 computes a determination threshold value based on the operating state of the engine and the like. An EGR flow rate diagnosing unit 75 diagnoses the EGR flow rate through comparison of the diagnosis parameter after correction with the determination threshold value.

Thus, the EGR flow rate can be diagnosed with accuracy even when the EGR flow rate is changed due to change in exhaust temperature and further the detected value of intake manifold pressure is changed. As a diagnosis parameter, the intake pressure obtained when the EGR valve is kept open may be adopted. The construction of the embodiment may be changed to such a construction that a determination threshold value is corrected based on an estimated value of exhaust temperature.

Other constructions can be adopted. In such a construction that the EGR flow rate is diagnosed through comparison of the pressure difference between the upstream side and the downstream side of the EGR valve with a predetermined determination threshold value, the following operation may be performed: the pressure difference between the upstream side and the downstream side of the EGR valve or the determination threshold value is corrected based on an estimated value of exhaust temperature. Thus, the EGR flow rate can be diagnosed with accuracy even when the EGR flow rate is changed due to change in exhaust temperature and further the pressure difference between the upstream side and the downstream side of the EGR valve is varied.

In such a construction that the opening of an EGR valve is controlled so as to maintain a desired EGR rate, the opening of the EGR valve may be corrected based on an estimated value of exhaust temperature. Thus, a desired EGR rate can be maintained even when the exhaust temperature changes.

As in fuel quantity increase correction, when the A/F sensor 16 or the heater 28 associated therewith becomes faulty or any trouble occurs in a processing unit related to element temperature detection or heater energization, the following problem arises: the element temperature or a parameter in correlation thereto becomes unknown, and exhaust temperature estimation becomes inaccurate. Therefore, it is advisable to avoid carrying out any correction related to EGR when the A/F sensor 16 or the like is anomalous.

According to the embodiment mentioned in detail above, the following excellent effects are obtained.

The exhaust temperature is estimated based on that the relation expressed as heater supplying heat quantity Qheat=emitted heat quantity Qlost holds in the heat balance of the A/F sensor 16. Therefore, even when the exhaust temperature must be detected in various applications, no additional construction, such as an exhaust temperature sensor, is required. As a result, the exhaust temperature can be estimated with accuracy without inviting such a problem as increase in cost due to the addition of a sensor or the like. Unlike related art, the active state of a sensor is not forcibly altered, and thus detrimental effects on air-fuel ratio control can be precluded.

The heater is energized in a state in which the engine 10 is at a cold stop and the exhaust system temperature is equal to a known temperature (substantially equal to the ambient temperature). The heater resistance correction coefficient (heat release quantity-related parameter) is calibrated through comparison of the heater supplying heat quantity Qheat with the emitted heat quantity Qlost at that time. Thus, any variation in heater resistance R can be absorbed. Even when variation with time occurs, that can be coped with. Therefore, the heater supplying heat quantity Qheat can be grasped with accuracy, and the accuracy of exhaust temperature estimation is enhanced.

The embodiment is so constructed that the proportional coefficient K related to the emitted heat quantity Qlost is corrected based on the number of engine revolutions (parameter in correlation to exhaust flow velocity) and the load (parameter in correlation to exhaust density). Therefore, the optimal proportional coefficient K suited for the operating state of the engine on each occasion can be set, and, in turn, the accuracy of exhaust temperature estimation is enhanced.

When the A/F sensor 16 or the like is faulty, exhaust temperature estimation is not carried out. Therefore, the reliability of the estimated value of exhaust temperature can be enhanced.

In such a construction that high-load increase correction and various corrections related to EGR are carried out, an exhaust temperature estimated with accuracy is used. Therefore, the high-load increase correction and the various corrections related to EGR can be favorably carried out.

The present invention is not limited to the embodiment described above, and may be implemented as follows, for example:

The above-mentioned embodiment is so constructed that energization of the heater for the A/F sensor 16 is duty controlled. Instead, the heater energization may be voltage controlled. In this case, the heater applied voltage V is variably set based on the difference between a detected value of element impedance and a target value thereof. Letting the heater applied voltage (amount of operation) be V, heater resistance R, and coefficient for conversion from power [W] to heat quantity [J/sec] C, the heater supplying heat quantity Qheat is expressed by Expression (5) below.

$$Qheat = C * V^2 / R \quad (5)$$

Also, in this case, the exhaust temperature can be estimated based on that the relation expressed as heater supplying heat quantity Qheat=emitted heat quantity Qlost holds.

Figure 16:
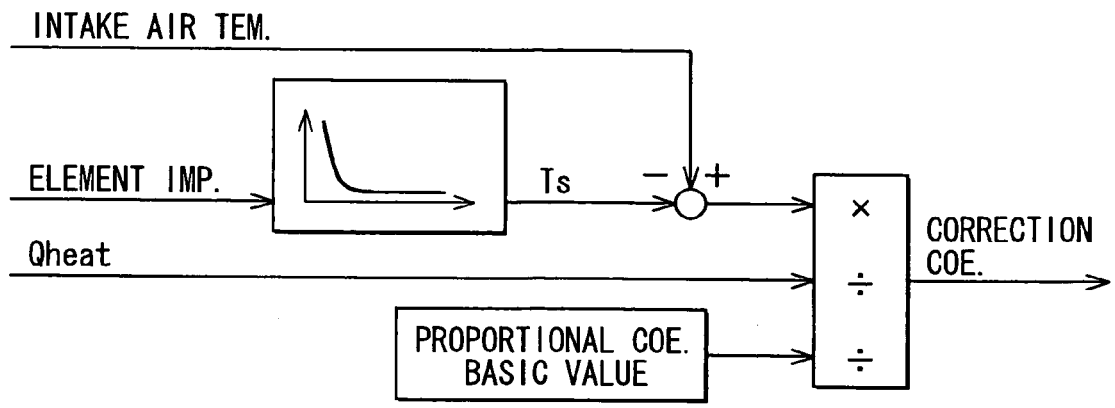
FIG. 16 is a block diagram illustrating an arithmetic logic for computing a correction coefficient for proportional coefficient correction.

In the above-mentioned embodiment, the heater resistance correction coefficient is updated as parameter calibration for exhaust temperature estimation. This construction may be modified as follows, for example: parameter calibration is carried out by updating the correction coefficient for correcting the proportional coefficient K. In this case, parameter calibration is carried out in a state in which the exhaust temperature becomes equal to the intake air temperature (i.e., the engine's cold stop state). As illustrated in FIG. 16, the difference between element temperature and intake air temperature is computed. The actual proportional coefficient is computed from this temperature difference and the heater supplying heat quantity. Further, the correction coefficient for proportional coefficient correction is computed through comparison of that actual proportional coefficient with the basic value of proportional coefficient. Thus, the proportional coefficient K can be updated, and any error in proportional coefficient can be absorbed. Therefore, the relation between the temperature difference between element temperature and exhaust temperature and the emitted heat quantity of the A/F sensor can be made favorable, and thus the accuracy of exhaust temperature estimation is enhanced. The proportional coefficient K itself can also be updated.

The present invention can also be so constructed that the following operation is performed: when the heater heat release quantity varies, the delay in response of the element temperature relative to that variation is measured, and the proportional coefficient K is computed based on the measured delay in response. As already mentioned, the delay in response (time constant) of the element temperature relative to change in heater heat release quantity can be expressed as "Ce/K," where Ce is the heat capacity of an element and K is a proportional coefficient. Since the heat capacity Ce is substantially invariable, the proportional coefficient K can be calculated back by measuring (or computing) the time constant.

Figure 17:
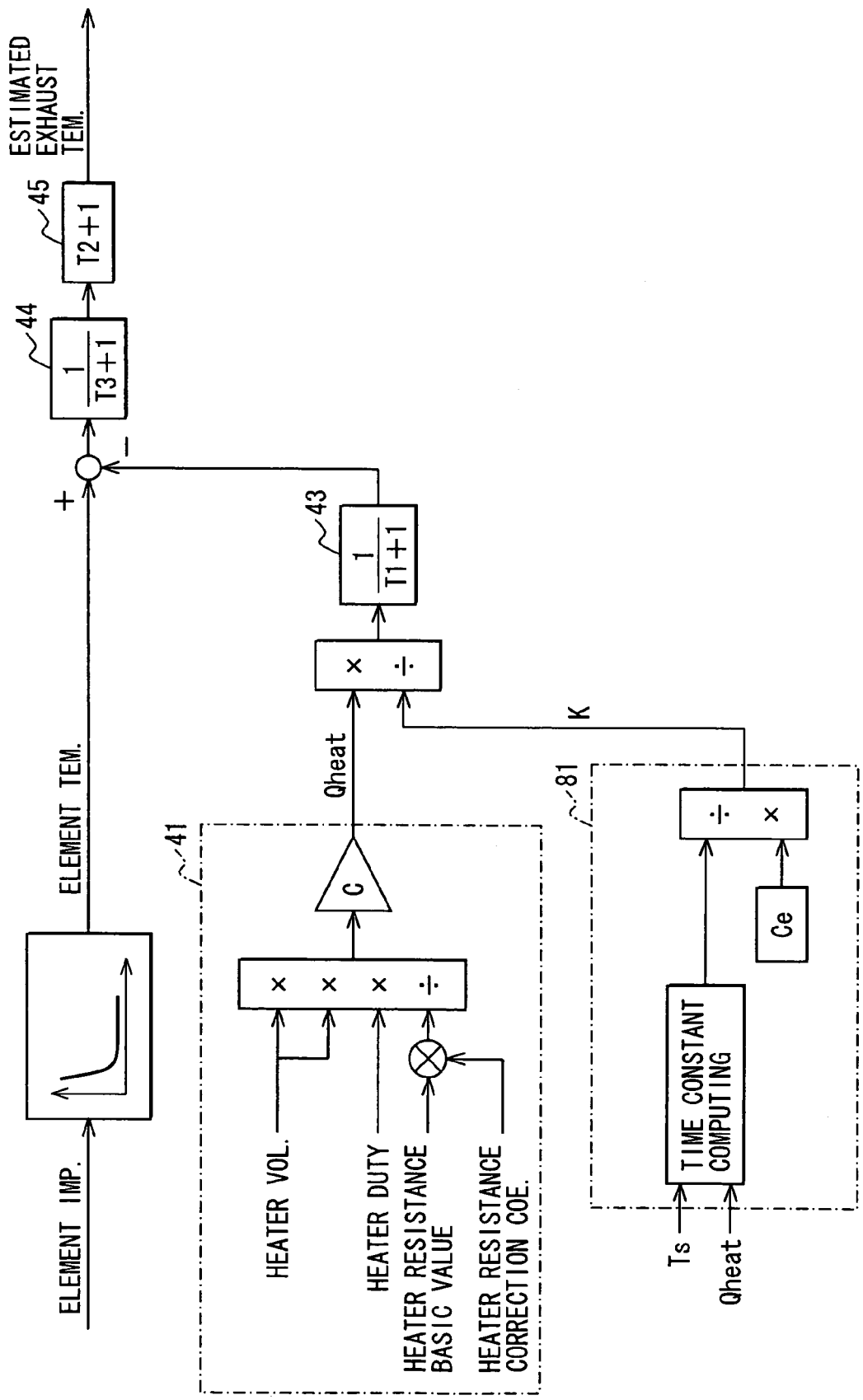
FIG. 17 is a block diagram illustrating an arithmetic logic for exhaust temperature estimation.

Description will be given to a concrete construction with reference to FIG. 17. FIG. 17 illustrates a construction that is substituted for that illustrated in FIG. 5. The same members as illustrated in FIG. 5 will be marked with the same numerals, and the description thereof will be omitted. In the example illustrated in FIG. 17, a proportional coefficient computation unit 81 takes in the element temperature and the heater supplying heat quantity, and computes a time constant based thereon. It computes a proportional coefficient K from the computed time constant and the heat capacity Ce. The exhaust temperature is estimated based on the element temperature and the heater supplying heat quantity using this proportional coefficient K.

When the proportional coefficient K is computed, the control duty Duty as the amount of heater energizing operation is forcibly temporarily changed. The time constant is computed based on change in heater supplying heat quantity and change in element temperature at that time. When the exhaust temperature of the engine is expected to be steady at this time, it is preferable that Duty should be forcibly varied. Even when Duty is not forcibly varied, however, variation in Duty equal to or above a predetermined amount can be detected during normal operation, and the proportional coefficient K can be computed when this variation occurs.

Figure 18:
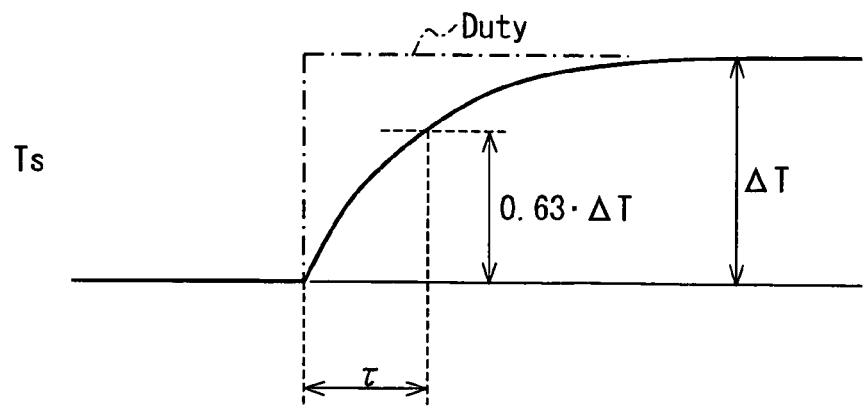
FIG. 18 is a time diagram illustrating change in element temperature versus change in Duty.

With respect to the computation (measurement) of time constant, various techniques have been disclosed in the past, and any technique can be used. An example will be taken. It will be assumed that the element temperature changes with variation in Duty as illustrated in FIG. 18. Letting variation in element temperature corresponding to variation in Duty be $\Delta T$, the time it takes for the element temperature to change by "$0.63 \times \Delta T$" is measured, and the measured time is taken as time constant $\tau$.

The following advantages are brought by computing the proportional coefficient K as mentioned above: any error in proportional coefficient K can be absorbed, and the temperature difference between element temperature and exhaust temperature can be properly brought into correspondence with the emitted heat quantity of the A/F sensor. Therefore, the accuracy of exhaust temperature estimation can be enhanced.

The proportional coefficient K computed as mentioned above may be stored as a learning value in backup memory, such as EEPROM. In this case, especially, it is preferable that the following procedure should be taken: multiple areas are provided by dividing the storage area of backup memory according to the operating ranges of the engine, and the computed value of proportional coefficient K is stored in accordance with the range of engine operation on each occasion. Thus, even when the proportional coefficient K is steadily varied due to aging factor or the like or in other like cases, the temperature difference between element temperature and exhaust temperature can be properly brought into correspondence with the emitted heat quantity of the A/F sensor.

The time constant $\tau$ computed as mentioned above can also be used as the time constant T1 for the delay correction unit 43 in FIG. 5 and the like. Thus, the accuracy of exhaust temperature estimation can be maintained even when change in engine operating conditions, an aging factor, or the like occurs.

In the above-mentioned embodiment, it is determined that the engine is in a cold stop state (state in which the exhaust system temperature substantially agrees with the ambient temperature) based on that the engine water temperature is sufficiently approximate to the ambient temperature. Instead, it may be determined that the engine is in a cold stop state based on that a predetermined time (e.g., 1 or 2 hours or so) enough to cool the engine has passed after the operation of the engine is stopped. That is, when a sufficient time has passed after the engine is stopped, the temperature of the area in the vicinity of the sensor should also be approximately equal to the ambient temperature. Therefore, the engine can be determined to be in a cold stop state.

In a case where high-load fuel quantity increase is carried out utilizing the exhaust temperature information of the engine, it is unnecessary to estimate the exhaust temperature itself. The fuel quantity increase may be corrected based on the element temperature or a parameter in correlation thereto. Specifically, it is advisable to reduce the fuel quantity increase when the element temperature (or a parameter in correlation thereto) is low. Thus, optimal fuel quantity increase can be carried out, and various problems, such as degradation in fuel economy due to excessive fuel quantity increase and the emission of unburned fuel (HC), can be solved. When the A/F sensor 16 or the heater 28 associated therewith becomes faulty or any trouble occurs in a processing unit related to element temperature detection or heater energization, the following problem arises: the element temperature or a parameter in correlation thereto becomes unknown, and exhaust temperature estimation becomes inaccurate. Therefore, it is advisable to avoid correcting the fuel quantity increase when the A/F sensor 16 or the like is anomalous.

The above-mentioned embodiment is so constructed that an A/F sensor is used as a gas sensor. Instead, the present invention may be so constructed that any other gas sensor is used. Such gas sensors include: an $O_2$ sensor that produces an electromotive force output corresponding to the concentration of oxygen in exhaust; a NOx sensor that detects the concentration of NOx in exhaust; and an HC sensor that detects the concentration of HC. The NOx sensor has multiple cells formed of a solid electrolyte layer. Of these cells, a pump cell (first cell) discharges or draws oxygen in exhaust and detects the concentration of oxygen, and a sensor cell (second cell) detects the concentration of NOx in the gas with oxygen discharged therefrom. Even when any of these other gas sensors is used, the exhaust temperature can be estimated based on that the relation expressed as heater supplying heat quantity Qheat=emitted heat quantity Qlost holds in such a construction that a sensor element is heated to a predetermined temperature by energization of a heater.

A process may be executed using a CPU, a ROM, and the like. Here, steps in the process may be constructed as means or units in program stored in the ROM or the like.

It will be obvious to those skilled in the art that various changes may be made in the above-described embodiments of the present invention. However, the scope of the present invention should be determined by the following claims.

What is claimed is:

1. An estimating device for exhaust temperature in an internal combustion engine, comprising:
   a gas sensor provided in an exhaust system of the internal combustion engine for detecting a concentration of a component in exhaust;
   a heater for heating the gas sensor;
   a temperature detecting unit for detecting element temperature data being one of (i) an element temperature of the gas sensor and (ii) a parameter in correlation to the element temperature;
   an energization controlling unit for controlling energization of the heater by feedback controlling an amount of heater energizing operation so that the element temperature data agrees with a predetermined target;
   a heat release quantity computing unit for computing a heater heat release quantity associated with the energization of the heater based on the amount of heater energizing operation that is feedback controlled by the energization controlling unit;
   an estimating unit for estimating the exhaust temperature based on a balance between (i) an emitted heat quantity of the gas sensor in proportion to a temperature difference between the element temperature and the exhaust temperature and (ii) the heater heat release quantity in proportion to heater power by using at least one of (i) an emitted heat quantity-related parameter in relation to the emitted heat quantity of the gas sensor and (ii) a heat release quantity-related parameter in relation to the heater heat release quantity;
   a unit for determining that the exhaust system of the internal combustion engine is in such a state that the temperature thereof becomes a given temperature; and
   a unit for permitting the energization controlling unit to energize the heater in a state in which the temperature is the given temperature; and
   a parameter calibrating unit for calibrating the at least one of (i) the emitted heat quantity-related parameter and (ii) the heat release quantity-related parameter through comparison of the emitted heat quantity of the gas sensor with the heater heat release quantity in a state in which the exhaust temperature is the given temperature,
   the estimating unit being further configured to estimate the exhaust temperature by using the at least one of (i) the emitted heat quantity-related parameter and (ii) the heat release quantity-related parameter, which are calibrated by the parameter calibrating unit.

2. The estimating device for exhaust temperature in the internal combustion engine according to claim 1,
   wherein the parameter calibrating unit takes, as the emitted heat quantity-related parameter, one of (i) a proportional coefficient for converting the temperature difference between the element temperature and the exhaust temperature into the emitted heat quantity of the gas sensor and (ii) a correction coefficient for the proportional coefficient, and calibrates the one.

3. The estimating device for exhaust temperature in the internal combustion engine according to claim 1,
   wherein the parameter calibrating unit takes, as the heat release quantity-related parameter, one of (i) a heater resistance required for heater power computation and (ii) a heater resistance correction coefficient, and calibrates the one.

4. The estimating device for exhaust temperature in the internal combustion engine according to claim 1,
   wherein, when the internal combustion engine is at a stop and the exhaust system is in such a state the temperature thereof substantially agrees with an ambient temperature, it is determined that the exhaust system of the internal combustion engine is in such a state that the temperature thereof becomes equal to the given temperature.

5. The estimating device for exhaust temperature in the internal combustion engine according to claim 1,
   wherein a proportional coefficient for converting the temperature difference between the element temperature and the exhaust temperature into the emitted heat quantity of the gas sensor is corrected based on an operating state of an internal combustion engine.

6. The estimating device for exhaust temperature in the internal combustion engine according to claim 1, further comprising:

a unit that, when the heater heat release quantity varies, measures a delay in response of the element temperature relative to the varying of the heater heat release quantity; and a unit that computes a proportional coefficient for converting the temperature difference between the element temperature and the exhaust temperature into the emitted heat quantity of the gas sensor based on the measured delay in response.

7. The estimating device for exhaust temperature in the internal combustion engine according to claim 6, further comprising:

a unit that forcibly temporarily varies the amount of heater energizing operation.

8. The estimating device for exhaust temperature in the internal combustion engine according to claim 7, wherein, when the exhaust temperature of the internal combustion engine is expected to be steady, the amount of heater energizing operation is forcibly temporarily varied.

9. The estimating device for exhaust temperature in the internal combustion engine according to claim 6, wherein the computed proportional coefficient is stored as a learning value in backup memory.

10. The estimating device for exhaust temperature in the internal combustion engine according to claim 1, wherein the temperature difference between the element temperature and the exhaust temperature is computed based on the heater heat release quantity computed by the heat release quantity computing unit, and a unit is provided which performs delay correction of the temperature difference with a time constant corresponding to a delay in change in the element temperature relative to change in the heater heat release quantity.

11. The estimating device for exhaust temperature in the internal combustion engine according to claim 10, further comprising:

a unit that measures the time constant of the element temperature when the heater heat release quantity varies, wherein the measured time constant is used for the delay correction.

12. The estimating device for exhaust temperature in internal combustion engine according to claim 1, further comprising:

a unit that performs advance correction of the exhaust temperature, estimated by the estimating unit, with a time constant corresponding to a delay in change in element temperature relative to change in exhaust temperature.

13. The estimating device for exhaust temperature in the internal combustion engine according to claim 1, wherein it is determined whether any one of the gas sensor, the heater, the temperature detecting unit, and the energization controlling unit is anomalous, and, when the any one is determined to be anomalous, exhaust temperature estimation by the estimating unit is not carried out.

14. An internal combustion engine control system comprising:

the exhaust temperature estimating device according to claim 1; and a fuel quantity increasing unit for increasing a fuel supply quantity when the internal combustion engine is operated under a high load, wherein a unit is provided which corrects the fuel quantity increase by the fuel quantity increasing unit based on the exhaust temperature estimated by the estimating unit.

15. An internal combustion engine control system comprising:

the exhaust temperature estimating device according to claim 1;

an EGR unit for recirculating the exhaust of the internal combustion engine to an air intake system; and an EGR flow rate estimating unit for estimating the EGR flow rate of the EGR unit, wherein a unit is provided which corrects an estimated value of the EGR flow rate of the EGR flow rate estimating unit based on the exhaust temperature estimated by the estimating unit.

16. An internal combustion engine control system comprising:

the exhaust temperature estimating device according to claim 1;

an EGR unit that has an EGR valve provided at a certain midpoint in an EGR passage and recirculates the exhaust of the internal combustion engine to an air intake system; and an EGR flow rate diagnosing unit that diagnoses an EGR flow rate through comparison of a diagnosis parameter determined from an intake pressure obtained when the EGR valve is open, with a predetermined determination threshold value, wherein a unit is provided which corrects the diagnosis parameter or the determination threshold value based on the exhaust temperature estimated by the estimating unit.

17. An internal combustion engine control system comprising:

the exhaust temperature estimating device according to claim 1;

an EGR unit that has an EGR valve provided at a certain midpoint in an EGR passage and recirculates the exhaust of the internal combustion engine to an air intake system; and an EGR flow rate diagnosing unit that diagnoses an EGR flow rate through comparison of a pressure difference between an upstream side and an downstream side of the EGR valve with a predetermined determination threshold value, wherein a unit is provided which corrects the pressure difference between the upstream side and the downstream side of the EGR valve or the determination threshold value based on the exhaust temperature estimated by the estimating unit.

18. An internal combustion engine control system comprising:

the exhaust temperature estimating device according to claim 1;

an EGR unit that has an EGR valve provided at a certain midpoint in an EGR passage and recirculates the exhaust of the internal combustion engine to an air intake system; and an EGR opening controlling unit that controls opening of the EGR valve so as to maintain a desired EGR rate, wherein a unit is provided which corrects the opening of the EGR valve based on the exhaust temperature estimated by the estimating unit.

19. The internal combustion engine control system according to claim 14, wherein it is determined whether any one of the gas sensor, the heater, the temperature detecting unit, and the energization controlling unit is anomalous, and, when the any one is anomalous, correction based on an estimated value of the exhaust temperature is not carried out.

20. The estimating device for exhaust temperature in the internal combustion engine according to claim 1, wherein the given temperature, which is used for the unit determining that the exhaust system of the internal combustion engine is in such the state that the temperature thereof becomes, corresponds to a state in which the internal combustion engine has been cooled down to a cold state after being stopped.

21. The estimating device for exhaust temperature in the internal combustion engine according to claim 1, wherein the parameter calibrating unit performs the calibrating after the engine is stopped.

22. The estimating device for exhaust temperature in the internal combustion engine according to claim 1, wherein the parameter calibrating unit performs the calibrating after an ignition switch of the engine is turned off.

* * * * *